United States Patent [19]

Lewis et al.

[11] Patent Number: 5,207,954
[45] Date of Patent: May 4, 1993

[54] METHOD OF MAKING COREACTABLE POWDERED COATINGS

[75] Inventors: Jeffrey M. Lewis, Charleston; Kenneth L. Hoy, Saint Albans, both of W. Va.; Michael J. Greene, Mt. Pleasant, S.C.

[73] Assignee: Union Carbide Chemicals & Plastics Technology Corporation, Danbury, Conn.

[21] Appl. No.: 900,779

[22] Filed: Jun. 22, 1992

Related U.S. Application Data

[63] Continuation of Ser. No. 819,648, Jan. 10, 1992, abandoned, which is a continuation of Ser. No. 412,191, Sep. 25, 1989, abandoned.

[51] Int. Cl.$^5$ ................................................. B29B 9/10
[52] U.S. Cl. ..................................... 264/13; 159/48.1; 523/342
[58] Field of Search .................. 264/13; 34/57 R, 10; 159/4.01, 4.08, 4.4, 48.1; 523/342

[56] References Cited

U.S. PATENT DOCUMENTS

| | | | |
|---|---|---|---|
| Re. 32,261 | 10/1986 | Hirota et al. | 525/28.5 |
| 3,326,848 | 6/1967 | Clemens et al. | 430/137 |
| 3,880,946 | 4/1975 | Labana et al. | 525/208 |
| 3,897,381 | 7/1975 | Tugukuni et al. | 260/29.2 |
| 3,976,716 | 8/1976 | Labana et al. | 260/836 |
| 4,211,691 | 7/1980 | Fitzgerald et al. | 260/42.21 |
| 4,608,401 | 8/1986 | Martin | 523/205 |
| 4,628,071 | 12/1986 | Morgan | 524/832 |
| 4,727,111 | 2/1988 | Pettit, Jr. et al. | 525/190 |
| 4,771,086 | 9/1988 | Martin | 523/205 |
| 4,794,167 | 12/1988 | Lindner et al. | 528/501 |
| 4,892,910 | 1/1990 | Klesse et al. | 525/221 |
| 4,892,932 | 1/1990 | Rauch et al. | 528/499 |
| 4,950,433 | 8/1990 | Chiu | 264/13 |

FOREIGN PATENT DOCUMENTS

| | | |
|---|---|---|
| 0195661 | 9/1986 | European Pat. Off. . |
| 0256369 | 7/1987 | European Pat. Off. . |
| 3544882 | 11/1986 | Fed. Rep. of Germany . |
| 48-7493 | 3/1973 | Japan . |
| 49-112990 | 10/1974 | Japan . |
| 50-33821 | 11/1975 | Japan . |
| 51-2094 | 1/1976 | Japan . |
| 1-96223 | 4/1989 | Japan . |
| 1-247473 | 10/1989 | Japan . |
| 1433064 | 4/1976 | United Kingdom . |

Primary Examiner—Mary Lynn Theisen
Attorney, Agent, or Firm—S. H. Hegedus

[57] ABSTRACT

Thermosettable, coreactable particulate powdereded compositions having particles comprising at least a first copolymer of an olefinically unsaturated monomer having at least one functional group and at least a second copolymer of an olefinically unsaturated monomer having at least one functional group which is reactive with the at least one functional group of the at least first copolymer are disclosed. Methods for making and using these compositions are also disclosed.

46 Claims, 7 Drawing Sheets

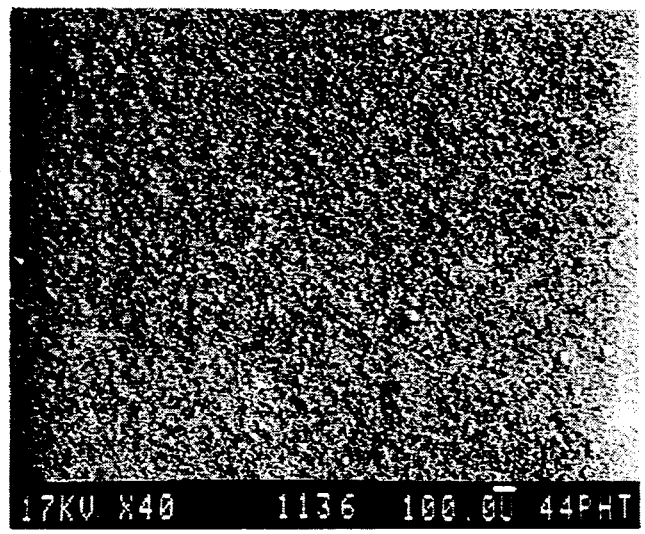
F I G. 3a
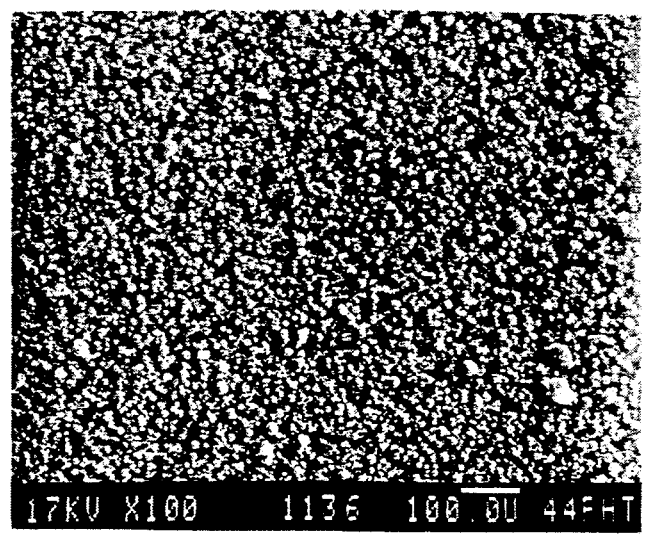
F I G. 3b

METHOD OF MAKING COREACTABLE POWDERED COATINGS

This application is a continuation of prior U.S. application: Ser. No. 07/819,648 Jun. 10, 1992, now abandoned, which is a continuation of application Ser. No. 07/412,191 Sept. 25, 1989, now abandoned.

FIELD OF THE INVENTION

This invention pertains to the field of coreactable powdered coating compositions. More particularly, the present invention is directed to thermosettable, coreactive powdered coating compositions which have improved physical and morphological properties desirably facilitating the formation of more uniform and continuous coating films.

BACKGROUND OF THE INVENTION

Powder coating compositions are extremely desirable for use in painting substrates in that they are essentially free of organic solvents which are conventionally utilized in liquid paint systems. Accordingly, economic and social benefits are realized through the use of powder coatings by achieving reduced air pollution, reduced energy use and, not insignificantly, reduced health and fire hazards.

Moreover, the use of powder coatings, as opposed to liquid paint formulations, also offers the advantages of, among other things, generally able to effectively coat a substrate in just one application; have high material yield (typically up to about 99% efficiency); and superior corrosion resistance.

Generally, powder coating compositions are prepared by first forming the desired resin material, usually by solution polymerization wherein the monomeric constitutients are dissolved in an organic solvent. After polymerization and isolation of the resulting resin, it is mixed with other resin constituents, if desirable; crosslinking agents; pigment, if desirable; and other conventional additives, such as, plasticizers, and the like. These components are then typically intimately mixed by melting the mixture ("melt mixing"), extruding the melted mixture and then cooling and crushing. This is then generally followed by a sequence of operations involving grinding, sifting, separation, and filtering, followed by more sieving.

To provide a desired color match, a number of different powder coatings, each possessing its own respective color, generally must be dry mixed. Typically, however, such dry mixing does not readily provide a true intimate mixing of the various colored constitutents. As a result, it is not unusual to see, upon visual inspection of a substrate coated with such a dry mixed composition, areas of the individual colors and a general non uniformity of the final color.

The substantially non-spherical, irregularly shaped particles formed as a result of the crushing and grinding operations noted above may have an undesirable effect on the uniformity and continuity of the resulting coating formed on the substrate after being heat cured. This may be due to a number of different phenomena occurring as a result of these non-spherical, irregularly shaped particles. For example, as a result of such irregularly shaped particles, agglomerates are easily and typically formed. This generally produces a non-uniform, uneven layer of the coating composition on the substrate, even before it is subjected to a heat curing step.

So too, during the heat curing step itself, the powder coating composition is hampered by these irregularly shaped particles to effectively flow out over the substrate in a uniform and even manner. Still further, these irregularly shaped particles may also affect the performance of electrostatically spraying the powder coating composition onto a substrate, the typical means by which such powder coating compositions are applied. Thus, such irregularly shaped particles may cause a non-uniform charging of the particles which results in undesirable clumping and corresponding unevenness in the coating layer on the substrate. So too, the irregularly shaped particles may not be able to be charged as well as the more spherical particles of the present invention.

Among other things, a need clearly exists to provide coreactable powdered coating compositions which are not only stable when stored until ready for use, but which can provide a true intimately mixed color blend which is uniform in color even when examined under close visual inspection. Moreover, in conjunction with these needs, a still further need exists for providing powdered coating compositions having the properties of being able to be applied onto a substrate as a more generally uniform and continuous layer and having improved flow out upon heat curing so as to ultimately produce coated substrates having more uniform and more continuous coating films thereon.

SUMMARY OF THE INVENTION

As used herein, it is understood that the term "powdered coating" is not limited to coatings which are only used to enhance the appearance of a substrate such as a paint, or which provide corrosion resistance, or the like. Included within the scope of this invention are coatings having other functions as well, such as, adhesive coatings, friction reducing coatings, mold release coatings, electrically conductive film coatings, and the like. Indeed, the coreactable powdered compositions of the present invention need not be used to form coatings all. The scope of the present invention includes the use of the powdered compositions with molding or extrusion techniques, and the like, to form solid or hollow polymeric bodies and substrates.

By virtue of the present invention, powdered coating compositions and their methods of preparation have been discovered which meet substantially all of the needs noted above and which avoid essentially all of the above-noted disadvantages.

More particularly, the powdered coating compositions of the present invention are comprised of copolymeric particles which are substantially uniform and spherical in shape. The substantial uniformity and sphericalness of these copolymeric particles, avoiding the irregular morphology of the prior art powder coatings caused by grinding operations, facilitates better application of these coatings onto the substrate; produces a more uniform layer of the coating on the substrate, even prior to melting and curing; and, moreover, provides for a better flow out of the coating when subjected to melting and curing conditions, all of which help to produce improved films having better uniformity and being substantially continuous. Moreover, by means of the powdered coatings of the present invention which contain the uniform, regular and generally spherical particles, thinner coatings (less than about 25 microns) may be utilized, if desired, (as compared to coating thicknesses of about 25 to 100 microns, i.e,.

approximately 1-4 mils, of the prior art) which, when pigmented, have equal or even better hiding power than powder coatings of the prior art.

The powdered coatings of the present invention are characterized by being a thermosettable, coreactable particulate powdered coating composition having particles comprising at least a first copolymer of an olefinically unsaturated monomer having at least one functional group and at least a second copolymer of an olefinically unsaturated monomer having at least one functional group which is reactive with the at least one functional group of the at least first copolymer. The mixture of these copolymers have an overall, weighted average glass transition temperature ($T_g$) of greater than about 25° C., and an overall, weight average molecular weight of less than about 50,000. Moreover, the particles are substantially uniform and spherical in shape.

In an alternative embodiment, the thermosettable, coreactable particulate powdered coating composition is comprised of particles having at least one copolymer of an olefinically unsaturated monomer having at least one functional group and at least one crosslinking agent which is capable of crosslinking the at least one copolymer where the at least one functional group is not substantially reactive.

Accordingly, in the preferred embodiments of the present invention, the powdered coating compositions advantageously may be cured without the use of crosslinking agents due to the presence of at least two coreactive functionalized groups in individual particles of the composition. Substantially all of the particles in the coating composition contain such coreactive functionalized groups. Such coreactivity in substantially each particle of the powdered compositions of the present invention is very advantageous and desirable. For example, it allows for the presence of compatible copolymers to be present in the individual particles having substantially the same structure but with different functionalized groups. As a result, when these copolymers are cured, a more homogeneous structure having superior clarity and structural properties such as toughness, flexibility, hardness, and the like, is obtained.

Such coreactivity in the individual particles is also desirable inasmuch as it does away with the need to find an appropriately compatible crosslinking agent which would provide the function of crosslinking while still producing a clear polymer which may be needed for coating compositions.

Of course, in the case where there is only one functionalized group present in the composition, or alternatively, two or more functional groups which are not substantially reactive with one another, a crosslinking agent is, nevertheless, required, and is within the broad scope of the present invention. In the preferred embodiments of the present invention, however, the copolymers contained in the particles of the coating composition are such that they have functional groups which are reactive with other functional groups also present in the particles.

The powdered coating compositions of the present invention are more free flowing, as measured by flow function data, than are powder coating compositions of the prior art which have been prepared by typical grinding techniques. In particular, flow function data indicate that, in the absence of any flow additives, the powdered coating compositions of the present invention, which are prepared by spray drying techniques, may be considered as "easy flowing", whereas coating compositions prepared by grinding techniques may be characterized as being in the "cohesive" range. Still further, the spray dried coating compositions of the present invention aerate more readily and are more fluid than typical ground powder coating compositions in the aerated state. In fact, the spray dried coating compositions of the present invention appear to flow much like a liquid when aerated.

In a preferred embodiment, at least a portion of the at least one copolymer encapsulates one or more water-insoluble particulate solids, such as, metals, metal oxides, pigments, fillers, combinations thereof, and the like. In general, such encapsulation facilitates the use of less solids due to the higher hiding power possessed by such encapsulated particles. High hiding power enables a paint manufacturer to substantially reduce levels of the more expensive hiding pigments thereby reducing costs of each pound of paint produced. Moreover, the encapsulated particles help even further to avoid the formation of aggregates thereby also helping to make a more uniform and continuous coating. Finally, as compared to a particle containing substantially only the copolymers of the present invention, a capsule contains such copolymers essentially only in its outer shell, the inner portion of the capsule containing the encapsulated solid. Hence, a much lesser amount of heat is needed to cause good flow out and levelling of the encapsulated materials having this relatively thinner wall of copolymer as compared to the solid copolymer particle.

Advantageously, the powdered coating compositions of the present invention are prepared by aqueous emulsion polymerization. Unlike solution polymerization which, as noted above, forms the copolymers from a solution containing organic solvent, the technique of the present invention essentially eliminates the use of organic solvents almost entirely. This, of course, desirably contributes to the reduction of air pollution and health and fire hazards. Moreover, unlike the solution polymerization technique which requires a dry mixing of resins possessing various colors in order to obtain a particular color match which produces a resultant powder composition which is generally not intimately mixed and therefore not uniform, by preparing the powdered coating composition from an aqueous medium as in the present invention, it is possible to provide a true color match in advance, even before the powder is ever formed, which is indeed intimately and uniformly mixed. As such, when the intimately mixed coating compositions of the present invention are applied to a substrate and cured, the resulting color is generally uniform throughout the coating, essentially without any areas of color blotchiness, even under close visual inspection.

In order to obtain the desirably regular and spherical particle shape in the copolymers of the coating compositions of the present invention, the aqueous dispersion, after polymerization to form the at least one copolymer, is spray dried. The ability to spray dry a dispersion containing copolymers which are coreactive with one another (or a functionalized copolymer with a crosslinking agent) to produce a dry powdered composition without premature crosslinking taking place is quite surprising. One who is skilled in the coating arts would generally not even allow copolymers containing coreactive functionalized groups (or a functionalized group and crosslinking agent) to be present in the same dispersion and then be heated at all for fear of premature reaction between these coreactive groups. Clearly, one skilled in this art would expect that subjecting such a dispersion to the conditions contained within a spray dryer would cause the functionalized copolymers to prematurely react with one another. Such premature reaction of the functionalized copolymers while they were in the spray dryer would cause undesirable crosslinking making the resulting powdered composition essentially useless as a coating material. Yet, despite what one skilled in the art would expect to happen, it has been discovered by virtue of the present invention that spray drying a dispersion containing coreactive functionalized copolymers does not, in fact, cause premature reaction thereof. Instead, a dry, powdered coreactive composition is advantageously produced having the desired uniform, regular and spherical copolymeric particles with at least two functionalized coreactive groups (or at least one functionalized group with an effective, compatible crosslinking agent).

Without wishing to be bound by theory, it is believed that the ability to successfully spray dry the aqueous dispersion containing the coreactive copolymers without their prematurely reacting with one another is due to the water being present. The water has a relatively high heat of vaporization thereby effectively utilizing most of the heat available in the dryer to the exclusion of the copolymers. Thus, the functionalized copolymers apparently never attain a high enough temperature which would cause them to react with one another. Moreover, the short residence time in the dryer also helps prevent such premature reaction. Still further, it is also believed that once the particles are formed in the dryer, the reactivity of such particles becomes low until such time as when they are subsequently melted.

However, in order to facilitate such spray drying and, moreover, provide good flow out during the final thermosetting heat curing step, the polymerization is carried out such that the mixture of the at least one or more of the copolymers formed have a relatively high overall, weighted average glass transition temperature and a relatively low overall weight average molecular weight In particular, the process for preparing the particulate powdered compositions of the present invention, in its broadest embodiment, comprises spray drying an aqueous dispersion containing at least one copolymer having at least one functionalized group made by polymerizing (i) at least one olefinically unsaturated monomer and (ii) at least one functionality providing monomer which is capable of being polymerized with the at least one olefinically unsaturated monomer, to form the particulate powder, a substantial portion of the particles each containing functionalized groups which are thermosettably reactive with each other.

Preferably, at least one or more of the copolymers formed during polymerization have a glass transition temperature ($T_g$) of greater than about 25° C. and a weight average molecular weight of less than about 50,000 such that the overall polymeric composition has a $T_g$ of greater than about 25° C. Moreover, as a result of the spray drying step, the particles in the resulting dried particulate powder are substantially uniform and spherical in shape.

In an alternative embodiment, one or more aqueous dispersions containing functionalized copolymers are mixed with the first aqueous dispersion either before and/or during spray drying.

In yet another embodiment, where the functionalized groups of the copolymers are not substantially reactive with one another, an effective amount of at least one crosslinking agent is added to the dispersion either before and/or during spray drying. Crosslinking agent may also be added to the powdered composition after spray drying as well.

In a preferred embodiment, as noted above, when the aqueous dispersion contains water-insoluble particulate solids such as metals, metal oxides, pigments, fillers, combinations thereof, and the like, it is desirable to encapsulate at least a portion of these solids with the at least one copolymer formed during the polymerization step. The encapsulation is enabled by the use of surfactants, such as bis-nonylphenol ethoxylates (BNP's), which facilitate the polymerization of the monomers so as to form a copolymeric structure around at least a portion of the particulate solids. For such encapsulation to be successful, it is preferable that the amount of surfactant utilized in the dispersion is less than its critical micelle concentration. As is well known to those skilled in this art, the critical micelle concentration is that concentration below which essentially no aggregates of surfactant molecules, i.e., micelles, are formed. While the formation of such micelles are acceptable when preparing a latex, in this preferred embodiment in which capsules are formed, such micelle formation is not desirable. The critical micelle concentration varies with the particular surfactant being used.

The present invention is also directed to forming a substantially uniform and substantially continuous coating on a substrate comprising the steps of:

a) applying a thermosettable, coreactable particulate powdered coating composition onto a substrate, said composition comprised of particles containing at least one copolymer of an olefinically unsaturated monomer having at least one functional group and at least a second copolymer of an olefinically unsaturated monomer having at least one functional group which is reactive with the at least one functional group of the at least first copolymer; and then (b) subjecting the coated substrate to thermosetting conditions to cure the at least one copolymer and the at least second copolymer and form the substantially uniform and substantially continuous cured coating on the substrate.

Preferably, the mixture of copolymers within the particles of the coating composition have an overall, weighted average glass transition temperature ($T_g$) of greater than about 25° C., and a weight average molecular weight of less than about 50,000. Morover, these particles are also substantially spherical in shape.

DETAILED DESCRIPTION OF THE INVENTION

Figure 1A:
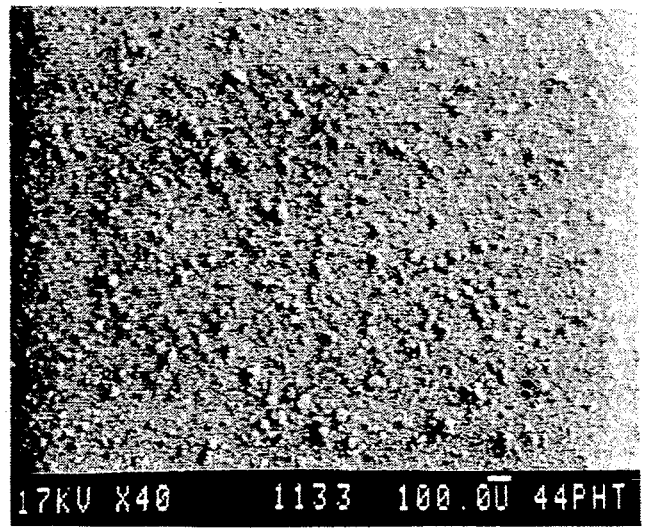
FIG. 1 is a series of photomicrographs of a typical ball-milled acrylic resin coating composition showing a magnification of 40X, 100X, 1000X, and 2000X in FIGS. 1a-1d, respectively.
Figure 1B:
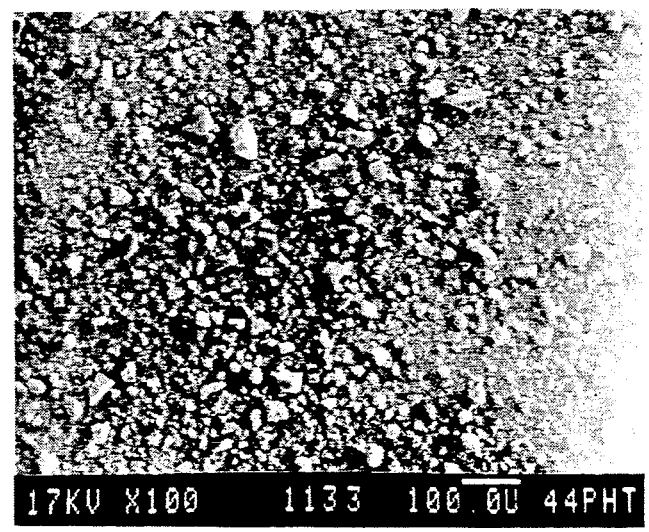
Figure 1C:
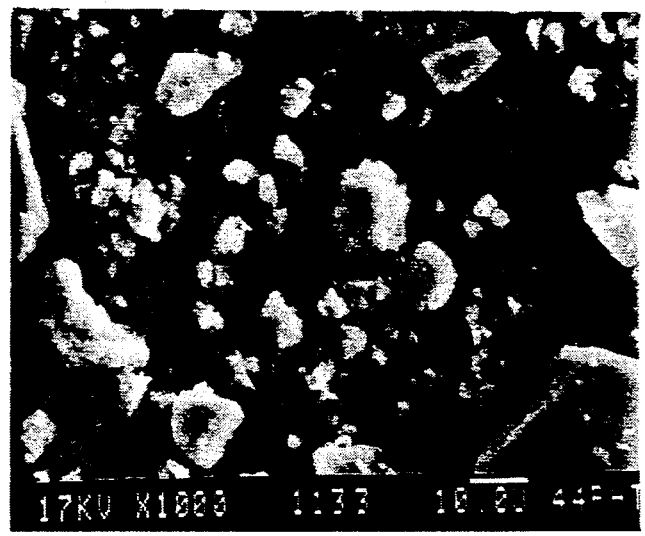
Figure 1D:
Figure 2A:
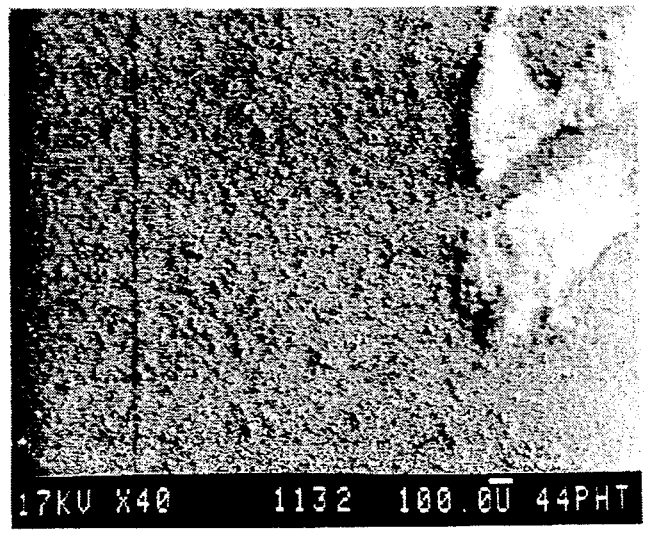
FIG. 2 is a series of photomicrographs of a thermosettable, coreactible coating composition of the present invention showing a magnification of 40X, 100X, 1000X, and 2000X in FIGS. 2a-2d, respectively.
Figure 2B:
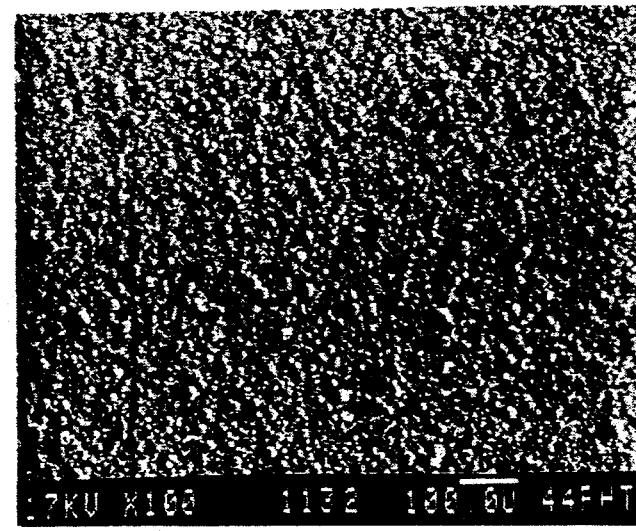
Figure 2C:
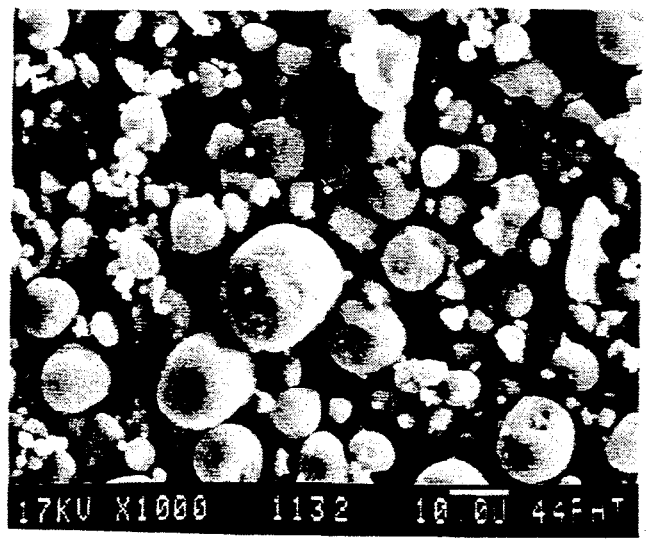
Figure 2D:
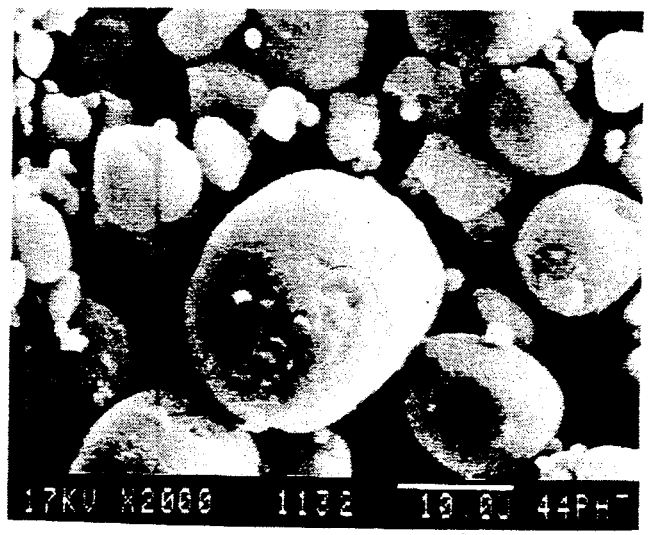
Figure 3C:
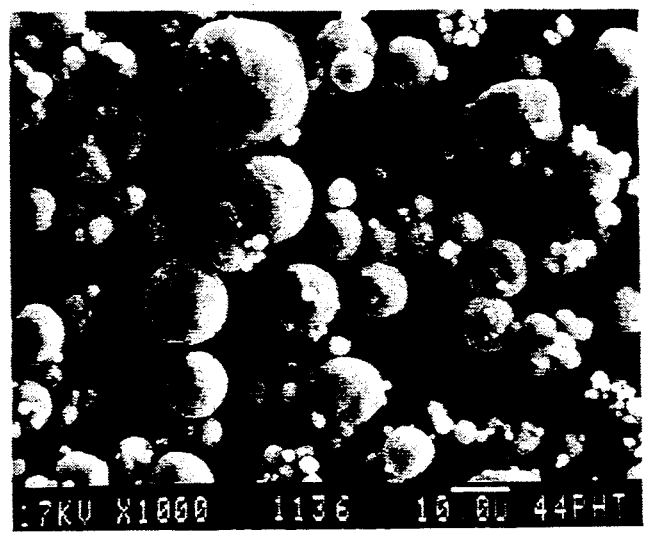
FIG. 3 is a series of photomicrographs of a thermosettable, coreactible encapsulated coating composition of the present invention showing a magnification of 40X, 100X, 1000X, and 2000X in FIGS. 3a-3d, respectively.
Figure 3D:
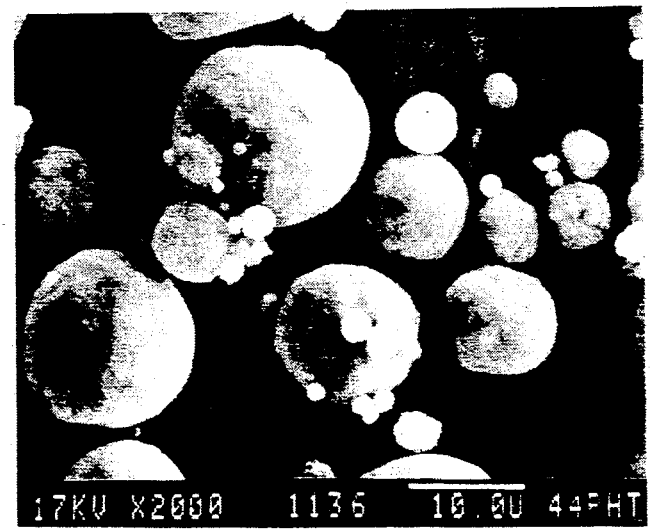

It should be understood that the term "aqueous dispersion" is not limited to a dispersion in which the sole constituent of the medium is water. Indeed, in some instances, it may be desirable to add water-miscible constituents to the dispersion to act as co-solvents. Such co-solvents may include, but are not limited to, methanol, ethanol, ethylene glycol, propylene glycol, combinations thereof, and the like.

The copolymers utilized in the coreactable powdered compositions of the present invention are readily formed by conventional free radical induced polymerization of the olefinically unsaturated monomers employed. As used herein, a "copolymer" refers to a copolymer of two or more different monomers at least one of which contains a functionalized pendant group such that the resulting copolymer has the at least one functional group pendant therefrom. Also as used herein, the phrase "functionality providing monomer" will refer to a monomer containing a functionalized pendant group which monomer is polymerizable with another monomer so as to form the copolymer.

One class of monomers that is utilized in making the copolymers of the present invention are olefinically unsaturated monomers which are quantitatively and qualitatively monofunctional. As used herein, a monoethylenically unsaturated monomer that is both qualitatively and quantitatively monofunctional has as its sole operative functionality its one olefinic unsaturation group. Such olefinically unsaturated monomers include, but are not limited to, styrene, methyl methacrylate, butyl acrylate, butyl methacrylate, and the like. Combinations of such olefinically unsaturated monomers may also be utilized in preparing the copolymers and indeed are preferred.

Preferably, the monoethylenically unsaturated, qualitatively and quantitatively monofunctional monomers are monomers having alpha-beta olefinic unsaturation. The term "alpha-beta" unsaturation as used herein includes both the olefinic unsaturation that is between two carbon atoms which are in the alpha and beta positions relative to an activating group such as a carboxyl group, e.g., the olefinic unsaturation of maleic anhydride, and the olefinic unsaturation between the two carbon atoms which are in the alpha and beta positions with respect to the terminus of an aliphatic carbon-to-carbon chain, e.g., the olefinic unsaturation of acrylic acid or styrene. These can be acrylates or a mixture of acrylates and monovinyl hydrocarbons. Preferably, in excess of 50% by weight of the copolymer monomers, preferably about 60 percent to about 98 percent by weight, and most preferably about 65 percent to about 80 percent by weight are esters of a $C_1$-$C_{12}$ monohydric alcohol and acrylic or methacrylic acid, for example, methyl methacrylate, ethyl acrylate, butyl acrylate, hexyl acrylate, 2-ethylhexyl methacrylate, butyl methacrylate, lauryl methacrylate, isodecyl methacrylate, acrylic modified caprolactones, and the like. Among the monovinyl hydrocarbons and substituted vinyl hydrocarbons which are suitable for use in the forming the copolymers of the present invention are $C_3$ to $C_{12}$, preferably $C_8$ to $C_{12}$, monovinyl hydrocarbons, such as, styrene, alpha methyl styrene, other vinyl monomers, such as, vinyl toluene, t-butyl styrene, chlorostyrene, vinyl chloride, acrylonitrile, methacrylonitrile, vinyl acetate, vinyl pivalate, vinyl versatate, and the like, which are all suitable for use in the present invention. Generally, the amount of monovinyl monomers used in the copolymer should be about 0% to about 30% by weight, preferably about 5% to about 20%.

The functionality providing monomers that are suitably utilized in the present invention are those which are copolymerizable with the monoethylenically unsaturated, qualitatively and quantitatively monofunctional monomers noted above and which have at least epoxy functionality, hydroxyl functionality, carboxylic acid functionality, amide functionality, anhydride functionality, combinations thereof, and the like.

Suitable epoxy functional monomers include, but are not limited to, glycidyl esters of a monoethylenically unsaturated acid, say, glycidyl acrylate, glycidyl methacrylate; vinyl cyclohexene monoxide, allyl ·glycidyl ether(s), allyl dimethyl glycidate, and the like.

Suitable hydroxyl functional monomers include, but are not limited to acrylates, typically esters of acrylic or methacrylic acids and aliphatic alcohols, such as, 2-hydroxyethyl acrylate, 2-hydroxyethyl methacrylate, 3-chloro-2-hydroxypropyl acrylate, 2-hydroxy-1-methylethyl acrylate, 2-hydroxypropyl acrylate, 2-hydroxybutyl acrylate, 4-hydroxybutyl acrylate, diethylene glycol acrylate, 5-hydroxypentyl acrylate, triethyleneglycol acrylate, 7-hydroxyheptyl acrylate, 2-hydroxymethyl methacrylate, 3-chloro-2-hydroxypropyl methacrylate, 3-hydroxypropyl methacrylate, 2,3-dihydroxypropyl methacrylate, 1,3-dimethyl-3-hydroxybutyl methacrylate, allyl alcohol, methylol acrylamide, hydroxy polyester acrylates, ethylene glycol acrylate, ethylene glycol methacrylate, propylene glycol acrylate, propylene glycol methacrylate, combinations thereof, and the like.

Suitable carboxylic acid group-containing monomers which may be used include, but are not limited to, acrylic acid and methacrylic acid, which are preferred, as well as crotonic acid, itaconic acid, fumaric acid, maleic acid, citraconic acid, and the like, as well as monoalkyl esters of unsaturated dicarboxylic acids such as itaconic acid, fumaric acid, maleic acid, citraconic acid, combinations thereof, and the like.

Suitable amide functional monomers include, but are not limited to, alpha-beta olefinically unsaturated amides, such as, acrylamide, methacrylamide, etc., combinations thereof, and the like.

Suitable anhydrides that may be used in the present invention include, but are not limited to, maleic anhydride, itaconic anhydride, dichloromaleic anhydride, dodecenyl succinic anhydride, tetrahydrophthalic anhydride, combinations thereof, and the like.

Preferably, the amount of functionality providing monomer that is used, in the aggregate, to make the copolymer by reacting with the monoethylenically unsaturated, qualitatively and quantitatively monofunctional monomers is in the range of from about 1% to about 30% by weight of the copolymer monomers, more preferably about 2% to about 15% by weight of the copolymer monomers present in the aqueous dispersion.

The choice of using one or more functionality providing monomers over another to make the copolymer in the aqueous dispersion will be influenced by a number of factors. Firstly, some of these functional groups may be reactive with one another while in the dispersion during polymerization. Consequently, in order to ensure that the powdered coating composition possesses active coreactive functional groups, such a premature reaction of the functional groups while in the dispersion during polymerization is not desirable. Accordingly, functionality containing monomers which are reactive with one another while in an aqueous medium under polymerization conditions should not simultaneously be present. One skilled in the art is well aware of which functional groups would react with another functional group while in an aqueous medium. Thus, the skilled artisan knows that, for example, a carboxylic acid-containing group would react with an epoxy-containing group. Conversely, however, the skilled artisan would also know that a carboxylic acid group would not readily react with a hydroxyl-containing group while in an aqueous medium. Other such reactive and non reactive combinations are also well known to those skilled in the art and the selection of appropriate, non-reactive combinations are made accordingly.

If it is desired, however, to provide powdered coating compositions containing copolymers having two or more functional groups which functional groups would react with one another while in the aqueous medium when heated, then it is possible to simply prepare these respective copolymers from different aqueous dispersions. In other words, one copolymer containing at least, for example, a carboxylic acid-containing group can be prepared in one aqueous dispersion while a second copolymer containing at least, for example, an epoxy-containing group can be prepared in a second aqueous dispersion. To prepare the powdered coating composition, the two dispersions, each containing their respective copolymers, may then be mixed and spray dried. The dispersions may be mixed either prior to and/or during spray drying. One of the advantages of the present invention is that even though the mixture of copolymers may have reactive functional groups, they do not react with one another, even during spray drying, until desired, i.e., when the powdered coating composition is subjected to melting and thermosetting curing conditions.

It should be understood from the above that if the starting dispersion contains monomers having more than one kind of functionality, for example, a carboxylic acid-containing monomer and a hydroxyl-containing monomer, then polymerization of these monomers with the at least one olefinically unsaturated monomer is going to produce copolymers containing only the carboxylic acid functionality, copolymers containing only the hydroxyl functionality, copolymers containing both the carboxylic acid and hydroxyl functionalities and, perhaps, copolymers containing neither of these functionalities. Upon subsequent spray drying of such a copolymeric dispersion, however, a substantial amount of the particles formed will respectively contain both the carboxylic acid and hydroxyl functionalities.

So too, when two or more dispersions are prepared each with its own respective functionalized group, such as an epoxy-containing copolymer in the first dispersion and a carboxylic acid-containing copolymer in the second dispersion, when subsequently mixed and spray dried, particles will again be formed where a substantial number of the particles will each contain both the epoxy and carboxylic acid functionalities.

In a preferred embodiment, the olefinically unsaturated monomer used in preparing substantially each of the copolymers, whether in one dispersion or in a number of dispersions which are then subsequently mixed together, is of essentially the same structure so as to desirably provide compatible copolymers.

Another factor which influences the use of one monomer as opposed to another is the properties that these materials may provide in the resulting copolymer and in the coreactive powdered coating composition which may affect the application and curing of the coating on the substrate and/or the properties of the resulting film coating. Thus, some monomers may facilitate good flow out during the thermosetting curing step which helps provide for smooth, glossy coatings, while some other functionality providing monomers may provide improved flexibility or impact resistance to the cured film. Moreover, the selection of the monomers may also be dictated by the intended end use of the powdered compositions. Clearly, if the intended end use of the powdered composition is as a frictional reducing coating, the monomers utilized may be quite different then if the intended end use is as an adhesive coating.

For example, caprolactone acrylate monomers are especially desirable for providing the cured film with good flexural properties. Flexibility providing monomers which are suitable include, but are not limited to, hydroxy polyester acrylate, hydroxy polyester methacrylate, combinations thereof, and the like. Other monomers which provide good flexibility include butyl methacrylate, 2-ethylhexyl acrylate, 2-ethylhexyl methacrylate, isodecyl methacrylate, lauryl methacrylate, ethyl methacrylate, ethyl acrylate, butyl acrylate, and the like.

Another factor for choosing certain monomers over others is their ability to react and form highly crosslinked copolymers with other monomers. In other words, the reactivity of particular monomers as compared to the monomer with which it is desired to be crosslinked should be considered in selecting the monomers to be used. For example, a monomer containing an acid functionality will generally be very reactive with another monomer having an epoxy functionality thereby desirably forming a highly crosslinked copolymer upon curing. Monomers which provide good functionality for high crosslinking include glycidyl methacrylate, methacrylic acid, 2-hydroxyethyl methacrylate, methylol acrylamide, maleic anhydride, methacrylamide, and the like.

Monomers which provide highly crosslinked copolymers and flexibility as well include carboxyl-terminated caprolactone acrylate, hydroxy polyester acrylate, hydroxy polyester methacrylate, and the like.

Still further, yet another factor for choosing some monomers over others is the influence that one or more of these monomers may have over the glass transition temperature ($T_g$) of the resulting copolymer. As noted above, it is important that the $T_g$ of one or more of the copolymers formed in the present invention be greater than 25° C. such that the resulting spray dried particles contain a copolymeric mixture with an overall glass transition temperature of greater than about 25° C. By choosing monomers whose homopolymers have a desirable combination of $T_g$s, it is possible to help control the glass transition temperature of the resulting copolymeric mixture. Generally, the higher the homopolymer $T_g$s of the specific monomers used to form the copolymer, the higher will be the $T_g$ of the resulting copolymer. The following table, Table I, sets forth a list of various monomers and homopolymers in conjunction with their respective glass transition temperatures, all of which are suitable for use in the present invention.

TABLE I

| Homopolymer Glass Transition Temperature | (°C.) |
|---|---|
| methyl methacrylate | 105 |
| n-butyl methacrylate | 20 |
| n-butyl acrylate | −54 |
| ethyl acrylate | −22 |
| methacrylic acid | 185 |
| acrylic acid | 106 |
| glycidyl methacrylate | 46 |
| 2-hydroxyethyl methacrylate | 55 |
| 2-ethylhexyl acrylate | 85 |
| isodecyl methacrylate | −41 |
| styrene | 100 |
| hydroxy polyester acrylate | −37 |
| hydroxy polyester methacrylate | 3 |

Generally a free radical initiator is needed to induce the polymerization reaction. A large number of free radical initiators are known in the art and are suitable for this purpose. These include, but are not limited to, peroxides, such as, benzoyl peroxide, caproyl peroxide, cylohexanone peroxide, lauryl peroxide, t-butylhydroxy peroxide, acetylcyclohexane sulfonyl peroxide, diisobutyl peroxide, di-(2-ethylhexyl) peroxydicarbonate, t-butyl peroxide, cumene hydroperoxide, t-butyl peroxypivalate, decanoyl peroxide, tetralin peroxide, acetyl peroxide, urea peroxide, methyl ethyl ketone peroxide, diisopropyl peroxy dicarbonate, hydrazine sulfate (3%), sodium persulfate sodium tetraborate (1%), dibenzoylhydrazine (5%), combinations thereof, and the like. Useful azo initiators include azobis-dimethylvaleronitrile, azobis-isobutyronitrile, combinations thereof, and the like. Persulfate initiators such as ammonium persulfate, potassium persulfate, sodium persulfate, and the like are especially suitable for use in the present invention. The persulfate initiators may be used alone or in combination with a reducing agent such as ferrous ammonium sulfate, dodecyl mercaptan, sodium bisulfite, sodium metabisulfite, sodium formaldehyde sulfoxylate, and the like. When using initiator combinations such as the persulfates and reducing agents, the polymerization is commonly referred to as a redox initiated polymerization. Such redox initiated polymerizations are useful when it is desired to have a lower temperature polymerization. Generally, the proportion of free radical initiator by weight of the mixture of monomers in the aqueous dispersion is at least about 0.2 and preferably between about 0.5 to about 2.0%.

Also included within the aqueous dispersion are chain transfer agents which are well known to those skilled in the art. These chain transfer agents control the molecular weight of the copolymer to a desired range. In the present invention, both the molecular weight and the molecular weight distribution of the copolymers are desirably controlled. The weight average molecular weight of those copolymers used in the coreactive powdered compositions which have a $T_g$ of greater than about 25° C. will preferably be less than about 50,000 and more preferably between about 4,000 to about 25,000. The molecular weight distribution, as measured by the ratio of weight average to number average molecular weight ($M_w/M_n$) is in the range of from about 1.0 to about 15.0, preferably from about 1.0 to about 4.0. Preferably, no more than 5.0% by weight of the copolymer has a molecular weight which is greater than about 50,000.

By controlling the molecular weight to the values recited above, a powdered coating composition may desirably be prepared having the advantageous property of good melt flow out when subjected to thermosetting heat curing conditions. In other words, the melt viscosity of the copolymers is proportional to the molecular weight which determines the degree of flow out of the coating. High molecular weight polymers will have high melt viscosity which will result in poor coating flow out. Average molecular weights and molecular weight distribution are easily determined by size exclusion chromatography.

Moreover, although the choice of monomers primarily has the most impact on the resulting $T_g$ of the copolymer, control of the molecular weight of the copolymers also has an effect, albeit to a lesser extent, on the glass transition temperature ($T_g$) of these copolymers such that it is controlled to within desired ranges. The $T_g$ of a polymer influences its hardness, stiffness and melt flow viscosity. The higher the $T_g$, the higher the temperature at which melt flow will occur. $T_g$ is described in "PRINCIPLES OF POLYMER CHEMISTRY" (1953), Cornell University Press, incorporated herein by reference. The $T_g$ can be actually measured or it can be calculated as described by Fox in "BULL. AMER. PHYSICS SOC.", 1, page 123 (1956). For measurement of the $T_g$ of a polymer, differential scanning calorimetry can be used.

In the present invention, it is preferred that the glass transition temperature of the at least one of the copolymers produced by the dispersion polymerization be at least 25° C., preferably in the range of from about 35° C. to about 110° C., and most preferably in the range of from about 45° C. to about 80° C., such that the overall, weighted average glass transition temperature of the copolymeric mixture is within those same ranges. For example, one copolymer may be present in the mixture in an amount of say 80% by weight having a $T_g$ of about 60° C. and a second copolymer may be present in an amount of say 20% by weight having a $T_g$ of about 20° C. With such a mixture, the overall, weighted average $T_g$ is approximately 52° C. which is within the most preferred range noted above. A $T_g$ in these ranges is desirable in the present invention in order to enable the carrying out of the next processing step which is the spray drying of the one or more dispersions. With a relatively high $T_g$, the copolymers will not prematurely soften while being dried and isolated in the spray dryer. Moreover, such a relatively high $T_g$ also desirably facilitates and enhances the storagability of the powdered coating compositions, all of which prevent premature reaction of the functionalized groups with one another.

Accordingly, the selection of appropriate chain transfer agents is important for molecular weight control so as to obtain low molecular weight copolymers and, desirably, to help in obtaining the desired glass transition temperature in the resulting copolymers. Preferably, the chain transfer agents are efficient, inexpensive, exhibit high transfer activity, produce controllable molecular weight distribution and do not adversely affect the polymerization rates. Suitable chain transfer agents that may be utilized in the present invention include, but are not limited to, those which cause chain transfer to modifiers; those which chain transfer to initiators; and those which chain transfer to monomers, all of which are well known to those skilled in the art. Those chain transfer agents which chain transfer to modifiers include, for example, mercaptans, solvents, halogenated materials, and the like.

Mercaptans are preferred and include non-toxic aliphatic mercaptans, mercaptocarboxyl acids having from 2 to 8 carbon atoms, and their esters. Examples of suitable mercaptans are n-butyl-3-methylmercaptopropionate, dodecyl mercaptan, mercaptovaleric acid, 2-mercaptobenzoic acid, mercaptosuccinic acid, 2-mercaptoethanol; 3-mercaptopropanol; 3-mercapto 1,2-propanediol; 3-mercapto-2-butanol; mercaptoacetic acid; 2-mercaptopropionic acid; 3-mercaptopropionic acid; n-butyl mercaptan; t-butyl mercaptan; n-hexyl mercaptan; 2-hydroxyethyl-3-mercaptopropionate; mercaptoisophthalic acid and alkyl esters thereof combinations thereof, and the like. It is preferred to utilize an aliphatic mercaptan or mercaptomonocarboxylic acid and/or a mercaptodicarboxylic acid containing from about 2 to about 6 carbon atoms, particularly, a mercaptoacetic acid or mercaptopropionic acid, and alkyl esters thereof. Particularly good results are obtained with t-butyl mercaptan, mercaptoacetic acid and butyl mercaptopropionate.

Particularly suitable solvents which may be utilized as chain transfer agents include acetone, toluene, benzene, isopropyl alcohol, acetonitrile, ethyl acetate, acetaldehyde, and the like. Suitable halogenated materials include, for example, carbon tetrachloride, carbon tetrabromide, chloroform, bromotrichloromethane, and the like.

Chain transfer agents which involve chain transfer to initiators include, for example, hydroperoxides, which commonly undergo chain transfer with growing polymer radical chains. With specific monomers, such as allyl monomers, say, allyl ethers, stable radicals are formed thus retarding or stopping the polymerization reaction and are typical of chain transfer agents involving chain transfer to monomers.

Generally, about 0.5 to 5.0 weight percent, based on the weight of the monomers in the aqueous dispersion is used, more preferably about 1.0 to about 3.0% by weight.

If it is desirable to prepare a powdered coating composition such that it is comprised of a copolymer having only one functionality, or alternatively, two or more functionalities which are not substantially reactive with one another, then it is necessary to include a crosslinking agent in the powdered composition so as to facilitate the curing of the copolymer when subjected to thermosetting curing conditions. The selection of a particular crosslinking agent is dependent upon the specific functionalized group(s) that is present in the copolymer, the choice of which is well known to those skilled in this art. Suitable crosslinking agents include, but are not limited to, multifunctional crosslinking agents, such as, isocyanates, for example, isophorone diisocyanate, hexamethylene diisocyanate, toluene diisocyanate, diphenylmethane diisocyanate, 1-chlorophenyl diisocyanate, triphenylmethane diisocyanate, trimethyl hexamethylene diisocyanate, and the like; epoxides, for example, triglycidyl isocyanurate, 3,4-epoxy cyclohexyl methyl-3,4-epoxy cyclohexyl carboxylate, and the like. Polycarbodiimides are also applicable. One skilled in the art can readily determine how much of these crosslinking agents to add in order to obtain the desired degree of crosslinking. Generally, it is desirable to obtain complete crosslinking. Preferably, such crosslinking agent is added to the aqueous dispersion either before and/or during spray drying. Alternatively, or in addition thereto, crosslinking agent may be admixed with the powdered composition after spray drying.

In addition to at least the monomers, chain transfer agents, and crosslinking agents (if any), the aqueous dispersion also contains surfactants. The surfactants are needed to maintain and stabilize the dispersion. Both ionic surfactants, non-ionic surfactants, and mixtures thereof are applicable in the present invention. Suitable surfactants include, but are not limited to, non-ionic surfactants such as nonyl phenol ethoxylates, typically nonyl phenol 40 mol ethoxylate, nonyl phenol 70 mol ethoxylate, nonyl phenol 100 mol ethoxylate, bisnonyl phenol polyethoxylates, and the like; anionic surfactants such as diester sulfosuccinates, typically sodium dioctyl sulfosuccinate, sodium bistridecyl sulfosuccinate, sodium dihexyl sulfosuccinate, sodium dicyclohexyl sulfosuccinate, sodium diamyl sulfosuccinate, sodium diisobutyl sulfosuccinate, and the like; anionic sufactants such as monoester sulfosuccinates, typically disodium ethoxylated alcohol half ester of sulfosuccinic acid, disodium ethoxylated nonyl phenol half ester of sulfosuccinic acid, a mixture of these two sulfosuccinates, disodium isodecyl sulfosuccinate, and the like; anionic surfactants such as nonyl phenol ether sulfates, typically ammonium salt of sulfated nonylphenoxy poly(ethyleneoxy) ethanol having various degrees of ethoxylation, and the like. Although not generally preferred, cationic surfactants include, for example, cetyl trimethyl ammonium bromide, and the like. By virtue of the present invention, it has been determined that where the dispersion to be stabilized contains copolymers having relatively high glass transition temperatures, the preferred surfactants are anionic.

Preferably, reactive surfactants are utilized in the present invention. Such surfactants, include, but are not limited to, sodium vinyl sulfonate, maleic acid half-ester of monomethylether of polyethylene glycol, maleic acid diester of monomethylether of polyethylene glycol, and the like. In addition to providing the function of a surfactant, these materials also react with the monomers during the polymerization step so as to help eliminate residual surfactant which could cause water sensitivity problems.

The amount of surfactant used in the aqueous dispersion has an affect on the size of the particles present in the dispersion. Thus, generally the more surfactant present in the dispersion, the more resin particles that are formed in the dispersion. The more particles formed, the smaller they are. However, an excess of surfactant may result in a final coating which is very hydrophilic causing poor wet adhesion and water resistance properties and is typically not desired.

In addition to and/or in lieu of the surfactants noted above, the dispersion may be stabilized as a colloidal stabilized system. This may be accomplished by the use of, for example, polymethacrylic acid, polyvinyl alcohol, and the like. Generally, about 0.1% to about 2% of such colloidal stabilizer is added to form a colloidal stabilized system, based on the weight of the total monomers present in the system. The use of a colloidal system generally tends to increase the size of the particles in the dispersion.

The aqueous dispersion may also contain various additives which are conventionally added to a coating composition. Such additives include non metallic and metallic pigments, fillers, plasticizers, flow aids, associative thickeners and the like.

Pigments can ordinarily include opacifying pigments such as titanium dioxide, zinc oxide, leaded zinc oxide, titanium calcium, as well as tinting pigment such as carbon black, yellow oxides, brown oxides, tan oxides, chromium oxide green, phthalocyanine green, phthalonitrile blue, ultramarine blue, cadmium pigments, chromium pigments, pearlescent pigments and the like. Filler pigments such as clay, silica, talc, mica, wollastonite, and the like may also be added, if desired.

When such one or more water-insoluble particulate solids are present in the aqueous dispersion, it may frequently be desired to encapsulate such solids in order to obtain the advantages thereof such as higher hiding power which is particularly applicable to the use of pigments. Encapsulation techniques, such as those disclosed in U.S. Pat. Nos. 4,608,401, 4,771,086, 4,209,333, co-pending application Ser. No. 331,305, filed on Mar. 31, 1989, now U.S. Pat. No. 4,981,882, and co-pending application Ser. No. 319,415, filed Mar. 6, 1989, which are all incorporated herein by reference, are well known to those skilled in the art, and are all applicable for use in the present invention. Other conventional encapsulation techniques are also applicable.

Generally, these encapsulation techniques involve the use of surfactants which are present in the dispersion in an amount which is below the critical micelle concentration of the particular surfactant. During polymerization to form the copolymers, the presence of the surfactants in the appropriate amounts causes encapsulation of the hydrophilic solids. Typically, the amount present in the dispersion is from about 1 weight percent to about 30 weight percent, preferably about 5 weight percent to about 20 weight percent, based on the weight of the particulate solids. Frequently, the surfactant is provided in a weight ratio of surfactant to monomer of 0 to about 100:1, say, about 1:1 to 50:1, more preferably, about 10:1 to 40:1.

Surfactants which have been found to be particularly suitable for encapsulation are non-ionic surfactants containing a hydrophilic group as a polyoxyethylene chain and a hydrophobic group such as a nonylphenyl group. Also included as suitable non-ionic surfactants are the polycondensates of propylene oxide and ethylene oxide with various hydrophobic groups. Examples are octyl or nonyl phenol polyethoxylates containing 10 to 150 ethylene oxide groups, polyethoxylated esters of fatty acids, polyethoxylated esters of fatty alcohols, ethylene oxide/propylene oxide block copolymers, fatty amine ethoxylates, alkyl-phenol formaldehyde novolac resin alkoxylates, and the like, and the non-ionic surfactants such as described in U.S. Pat. No. 4,608,401, columns 11-13; and U.S. Pat. No. 4,209,333.

The dispersion may also contain crosslinking inhibiting agent to help retard crosslinking during spray drying, for example, alcohols to inhibit crosslinking of melamines.

The coating composition may also contain certain other additives such as degassing agents which allow volatiles to escape from the film during baking (the thermosetting heat curing step) and flow control agents which prevent cratering of the finish. Benzoin is a highly preferred degassing agent and when used is present in amounts ranging from about 0.5 to about 3.0 percent by weight based on the total weight of the monomers.

Suitable flow control agents may include, but are not limited to, fluorinated polymers such as an ester of polyethylene glycol or polypropylene glycol and fluorinated fatty acids, for example, an ester of polyethylene glycol of a molecular weight of over 2500 and perfluorooctanoic acid. Polymeric siloxanes of molecular weights over 1000 may also be used as a flow control agent, for example, poly(dimethylsiloxane) or poly(methylphenyl)siloxane. In addition, polyacrylates may also be used, such as, poly(2-ethylhexyl acrylate), poly(isodecyl methacrylate), poly(ethylacrylate-co-ethylhexyl acrylate), and the like. The flow control agent when used is present in amounts of about 0.5 to 5.0 percent by weight based on the total weight of the monomers.

Since the powdered coating compositions are typically applied to a substrate by electrostatic spraying methods, one may also desire to include a small weight percentage of an antistatic agent. The amount of such antistatic agent added is well within the knowledge of those skilled in the art. Suitable antistatic agents include, but are not limited to, tetraalkylammonium salts such as tetrabutylammonium chloride (bromide or iodide), tetraethyl ammonium chloride (bromide or iodide), trimethylbenzyl-ammonium chloride, etc.; alkyl poly(ethyleneoxy) phosphate or alkyllauryl poly(ethyleneoxy) phosphate; polyethyleneimine, poly(2-vinyl pyrollidone), pyridinium chloride, and the like.

Any of the additives noted above may be added to the dispersion prior to or after polymerization. Alternatively, they may be added to the coating composition in the dry state, after the dispersion has been dried. Preferably, however, the various additives are added to the dispersion after polymerization has taken place. If added prior to polymerization, there is a possibility that the dispersion may become unstable. Adding these additives to the dry powder may result in inefficient mixing. Of course, where it is desired to encapsulate any of the solids, such as the pigment, the pigment must be present in the dispersion prior to polymerization.

In practicing the invention, the monomer mixture is added to the aqueous phase which contains at least a portion of the surfactant. Generally, the monomer mixture is added in stages which is drawn out over a period of hours, or may be added all at once. The at least one radical initiator is separately added to the aqueous phase.

Polymerization is carried out by techniques well known to those skilled in the art. Generally, polymerization is carried out at temperatures of between about 30° C. to about 90° C., and preferably between about 60° C. to about 85° C. in accordance with the present invention using a monomer to water weight ratio of between about 0.1:1 to about 1.5:1, preferably between about 0.3:1 to about 1:1 with reaction times being from about 2 to 6 hours. Typically, the initiator and monomer mixture are blended separately and added to the aqueous medium either as an entire lot or with metered additions of the monomer mixture to the aqueous medium. Alternatively, a portion of the surfactant and/or initiator may initially be dispersed in the aqueous medium, prior to the addition of the monomer mixture. In another alternative embodiment, the surfactant is dissolved or dispersed in the monomer mixture. Particle size in the suspension can be controlled, in addition to the appropriate selection of the particular monomers used, by the type and quantity of surfactant used, and by agitation. Homogenization can be used to reduce particle size prior to or during polymerization.

Polymerization is actually begun by raising the temperature to the appropriate level in the presence of the radical initiator. The reaction is complete when the monomers have been consumed, generally when the exotherm reaction has stopped. After polymerization is completed and the desired copolymers have been formed having the at least one or more functionality groups pendant therefrom, the copolymers are isolated by spray drying.

One or more dispersions, each containing copolymer prepared in accordance with the present invention, may be admixed with one another prior to being spray dried. The respective dispersions may each be made to possess a different color, such as a primary color, and thereby form a desired color match. Such premixing of the dispersions, each containing their own respective copolymers and corresponding functionality groups, and optionally different colors, provides for an intimate mixing of these copolymers which is generally not available by mechanical grinding, dry mixing, or the like. If desired, it is also possible to introduce the respective dispersions into the spray dryer at two different inlet locations and allow the constitutents to intimately mix with one another as they are comingled and passed through the spray dryer and dried.

The spray drying is carried out in conventional, commercially available spray drying equipment under temperature and pressure conditions known to those skilled in the art. Ordinarily, spray drying is carried out at a temperature in the range of from about 30° C. to about 150° C. and at a pressure in the spray dryer which is subatmospheric, atmospheric, or superatmospheric. The specific temperature and pressure requirements for any specific dispersion or mixture of dispersions will depend upon the components thereof. Neither temperature nor pressure are narrowly critical in the present invention. However, the temperature should not be so high that it causes a premature softening or melting of the copolymers which would cause sticking of the resin to the walls of the dryer and/or premature reaction of the functionalized groups present in the copolymers. Of course, by providing copolymers having high glass transition temperature, such premature softening or melting is substantially avoided.

As a result of spray drying and the other factors discussed above, such as the choice and amount of surfactant, the dried coreactive powdered composition is comprised of copolymeric particles having a median particle size of from about 0.1 to 50.0 microns, preferably from about 5.0 to about 25.0 microns. For the encapsulated particles, the median particle size is from about 0.4 to 50.0 microns, preferably from about 5.0 to about 35.0 microns. Most importantly, the particles are substantially uniform and regular in shape, generally spherical.

The coreactive powdered composition is applied to a substrate by any conventional means. When a coating film is desired, the powder is typically applied by electrostatic spraying or by the use of a fluidized bed. In fact, the substrate may simply be dipped into a partially molten coating composition. Preferably, however, the powdered coating composition is applied by electrostatic spraying. The powdered coating composition may be applied in one pass or in several passes to provide a film thickness after cure of less than about 75 microns, generally about 10 to about 50 microns, and most preferably about 15 to about 30 microns.

The substrate to be coated can optionally be preheated prior to application of the powder to promote more uniform deposition. Upon application of the powder, the powder-coated substrate is then subjected to curing conditions so as to crosslink the functionalized groups present in the copolymers. Curing is carried out under conditions which are well known to those skilled in the art. Generally, the curing is carried out by subjecting the powder-coated substrate to temperatures of about 100° C. to about 300° C. for about 5 to about 60 minutes.

If desired, the rate of cure may be increased or decreased by the use of added catalysts which may be added to the dispersion prior to and/or during spray drying or by contacting such catalysts with the coating after it has been applied to the substrate such as by vapor-phase catalysis. Such catalysts include stannous octoate, dibutyl tin dilaurate, stannous stearate, and the like.

The present invention, however, is not limited to producing only films. Indeed, the coreactive powdered compositions of the present invention can be used for preparing solid articles by means of conventional molding or extrusion techniques.

EXAMPLES

I. Powder Flow Properties

The powder flow properties of a powdered composition prepared in accordance with the present invention was compared to a prior art composition which has been ground in a conventional manner.

Test Materials

Two samples of powdered coating compositions were tested. The first was a spray dried powder of the present invention comprised of the following composition:

| Component | % By Weight |
|---|---|
| styrene | 20 |
| butyl methacrylate | 30 |
| methyl methacrylate | 40 |
| methacrylic acid | 10 |

This coating composition is referred to as Composition No. 9-84 for further reference herein.

The conventional ground material was a commercial acid modified acrylic resin composition manufactured by S. C. Johnson & Son, Inc. and identified as SCX-817-C. This resin is fully described in an S. C. Johnson & Son, Inc. publication authored by M. K. Yousuf, entitled "New Thermosetting Acrylics for Powder Coating" published in Aug. 1988. This prior art coating composition is referred to as Composition No. 915 for further reference herein.

Test Equipment and Procedure

A Peschl rotational shear test apparatus was used to generate flow property data. The Peschl shear tester is composed of a shear cell, load cell for measuring forces and chart recorder. Samples were placed in the shear cell, consolidated under vertical loads and horizontally sheared under various vertical shear loads.

Instantaneous shear tests were conducted for three levels of consolidation for each sample tested. During these tests the material is loaded into the shear cell, consolidated under load and sheared under different loads. The instantaneous shear tests provide data which is used to determine design criteria necessary to maintain steady mass flow.

Sliding wall friction was measured on stainless steel plate. To measure wall friction angles the material is placed in a shear cell ring that is resting on a metal plate. The material is consolidated and slid across the plate under various normal loads. The wall friction angle represents the tangent of the coefficient of sliding friction.

Test Results

A. Bulk Densities

The resulting powder flow properties are presented in Table II. Bulk densities were measured loose (aerated), tapped and packed. Packed densities were measured in the shear cell while the material was under consolidation loads. Loose or aerated densities were measured just after shaking a graduated cylinder of the material to aerate the powder. Tapped densities were measured after tapping the cylinder to deaerate the powder.

The spray dried powdered coating composition of the present invention has a bulk density significantly less than that of the conventional ground material. The spray dried material aerates to a bulk density of 15.6 lb/cu-ft and flows similar to a liquid in the aerated state. The packed density of this material is 33 lbs/cu-ft. Therefore the material expands 111% when aerated.

The ground prior art material has an aerated bulk density of 22.6 lbs/cu-ft. This material qualitatively does not appear as fluid as the spray dried material when aerated. The packed density is 45.5 lbs/cu-ft. Therefore the material expands 101% when aerated.

B. Bulk Powder Flow Properties

Effective angles of internal friction for both materials are also presented in Table II. The effective angle of internal friction is a measure of the sliding friction of material sliding over material. The higher the effective angle of internal friction, the higher the sliding friction. This angle is used to determine hopper slopes required for mass flow, outlet dimensions for no bridging and bin mass flow horizontal wall pressure profiles.

The kinematic sliding wall friction angle is presented for each material on stainless steel. The higher the wall friction angle the higher the coefficient of sliding friction. The spray dried material had the lower sliding wall friction angle on stainless steel. The wall friction angles are necessary for determining hopper slopes for mass flow, minimum outlet dimensions for no bridging and bin wall pressure profiles.

The wall friction and internal friction data were used to determine the maximum conical hopper half angles required for mass flow. Mass flow is desirable over funnel flow because the material flows through the bin in a first in first out fashion. In addition, flow patterns and horizontal wall pressures are unpredictable during funnel flow. A mass flow hopper will provide steady uniform flow.

Figure 4:
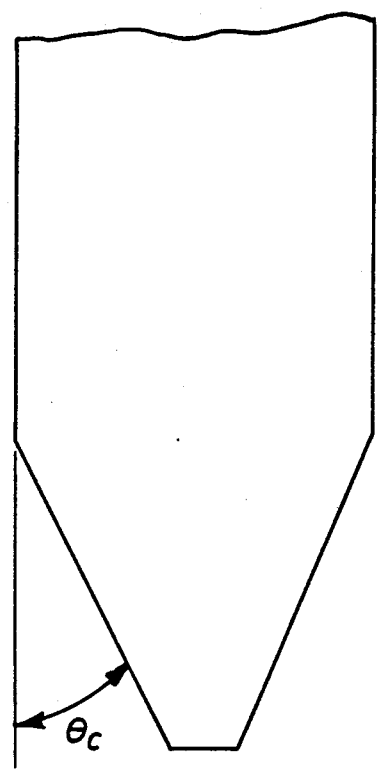
FIG. 4 is a diagrammatic representation of the definition of the hopper half angle.

The maximum conical hopper half angles for mass flow in stainless steel bins are also presented in Table II. The definition of a hopper half angle, i e., $\theta_c$, is presented in FIG. 4. Hopper half angles are such that a conical section somewhat shallower than the standard 60° hopper (30° hopper half angle) is required for both powders. Steeper hoppers will also mass flow. The spray dried powder will mass flow in a shallower hopper than the ground powder.

Hopper half angles required to achieve mass flow in plane flow hoppers (rectangular or wedge shape hoppers) are also presented in Table II. The plane flow hopper slopes required for mass flow are not as steep as required in conical hoppers due to the different geometry.

Figure 5:
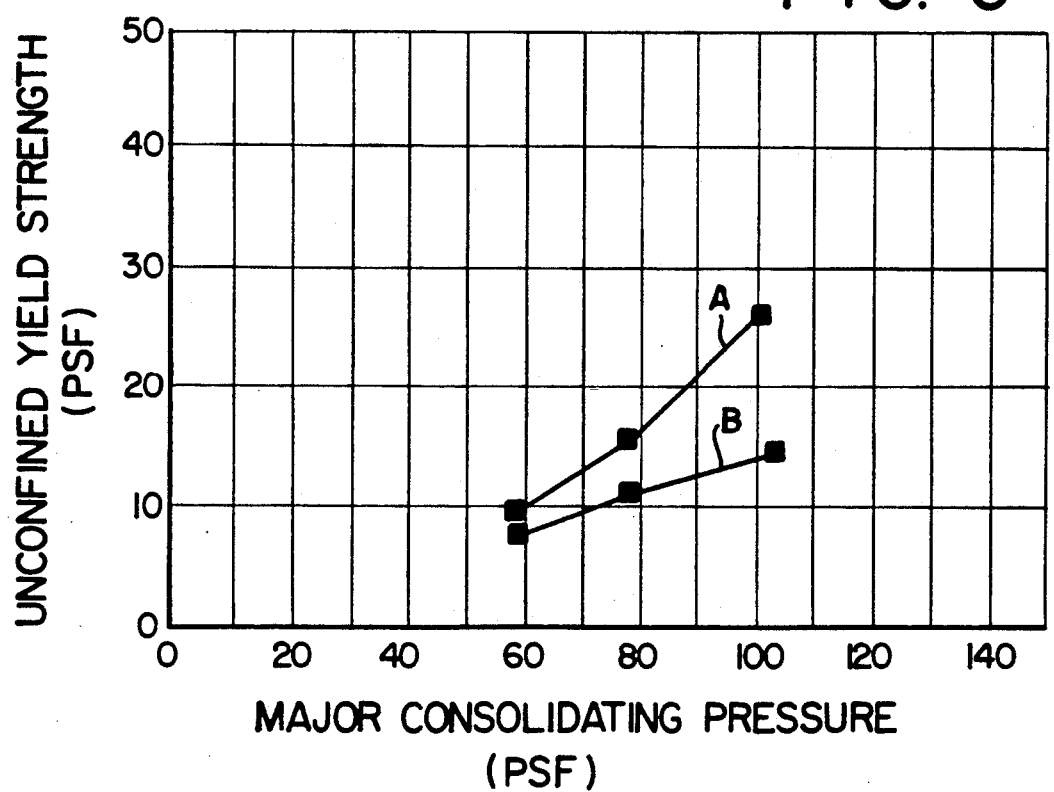
FIG. 5 is a series of graphs comparing the flow functions of the powdered coating compositions of the present invention with a typical ground coating composition.

Flow function curves were prepared for each material as shown in FIG. 5 where Curve "A" is the prior art ground commercial material and Curve "B" is the spray dried material of the present invention. The flow function is the relationship between the consolidating load on the material and the resulting strength gained by the material. This strength is what causes the material to bridge or plug an outlet from a hopper. Flow functions are used to determine the overall flowability of the material and the minimum hopper opening required to prevent bridging. Flow function curves for each material are attached. In general, the steeper the flow function the more cohesive and less free flowing the material. FFo is the instantaneous flow function representing the material characteristics during flow. FFt is the time flow function representing the material characteristics when flow resumed after a no flow condition. Time flow functions were not measured.

Table II presents data on the instantaneous flow functions for each of the materials. FFo and FFt represent the inverse slopes of the flow function curves. If FF > 10, then the material is considered free flowing. If 10 < FF < 4, then the powder is considered easy flowing. On the other hand, if 4 < FF < 2, then the powder is considered cohesive. If FF < 2, then the powder is considered very cohesive and non-flowing. The spray dried powder of the present invention fits in the easy flowing category (FF = 7.2) while the ground product of the prior art is in the cohesive category (FF = 3.9).

An additional piece of information to be gained from these tests is a prediction of the minimum hopper outlet required to prevent bridging. Table II also presents these numbers as well. A stainless steel hopper with a 30° hopper half angle was assumed in these calculations to ensure mass flow conditions. Both materials will discharge through an opening of at least 5 inches.

C. Additional Observations

The spray dried powder of the present invention aerated more readily than the ground, prior art powder. In addition, the spray dried material deaerated much more slowly than the prior art powder. Evidence of this behavior was observed when loading the shear cells. When weight was applied to the shear cell cover, the spray dried material would flood out of the top of the cell between the ring and cover. The spray dried material had to be stored under load for several hours to deaerate the powder before shearing to obtain consistent shear data. The commerical, prior art powder did not require this special treatment.

As noted earlier, qualitative observations indicate that the spray dried material flows much like a liquid when aerated. While aeration of the prior art powder improves flowability, it does not appear as fluid as the spray dried powder. Accordingly, the spray dried powder is expected to flow more readily than the ground powder when in an aerated state.

TABLE II

| | POWDER FLOW PROPERTIES | | | | |
|---|---|---|---|---|---|
| | BULK DENSITY (LB/CU-FT) | | | EFFECTIVE ANGLE OF INTERNAL | KINEMATIC WALL FRICTION |
| SAMPLE | LOOSE | TAPPED | PACKED | FRICTION (degrees) | ANGLE |

TABLE II-continued

| | | | | MAXIMUM HOPPER | MINIMUM OUTLET |
|---|---|---|---|---|---|
| | | | | | |
| LATEX SCX-817-C ground | 22.6 | 35.9 | 45.5 | 18.7 | 10.9 |
| LATEX ST/BMA/MMA/MAA spray dried | 15.6 | 26.3 | 33.0 | 16.5 | 8.7 |

| | FLOW FUNCTIONS | | MAXIMUM HOPPER HALF ANGLE FOR MASS FLOW | | MINIMUM OUTLET DIMENSION |
|---|---|---|---|---|---|
| SAMPLE | FFo | FFt | (conical) | (wedge) | (inches) |
| LATEX SCX-817-C ground | 3.9 | NA | 44 | 49 | 5 |
| LATEX ST/BMA/MMA/MAA spray dried | 7.2 | NA | 48 | 53 | 5 |

NOTES:
1) Kinematic Wall Friction Angle Measured on Stainless Steel.
2) Minimum Outlet Dimension Given for Conical Hopper with 30 degree Hopper Half Angle.

II. POLYMER PREPARATION, POWDER COATING PREPARATION AND COATING APPLICATION

A. Experimental Conditions

Reaction temperature was controlled using an Isotemp Immersion Circulator (Fisher Scientific; Model 730) and a water bath. Monomers and initiators were fed into the reactor via plastic feed lines and Fluid Metering, Inc. (FMI) Lab pumps (Models RP-G6 and RP-G50, respectively). The stirring rate was such that a slight vortex was maintained throughout the polymerization, generally 275-300 rpm was sufficient.

B. Latex Preparation Using Mix Surfactant (Latex Ref. No. 10-68)

A two liter flask fitted with a water reflux condenser/nitrogen outlet, mechanical stirrer, stainless steel stirring shaft and impeller, thermocouple, nitrogen inlet, initiator feed lines and monomer feed line was charged with the following:

| | |
|---|---|
| Distilled water | (500 g) |
| AEROSOL OT-75 | (0.40 g; 75% active solids) |
| TERGITOL NP-40 | (1.56 g; 70% active solids) |
| Monomer mix | (25 g) |

The mixture was heated to about 85° C., while purging with nitrogen, and the following initiator solution was charged:

| | |
|---|---|
| Ammonium persulfate | (1.5 g) |
| Distilled water | (73.5 g) |

With this addition the reaction temperature was lowered to 80°-81° C. and was held constant throughout the remainder of the polymerization.

The following monomer mix was fed into the reactor at a rate of 3.06 mL/min:

| | |
|---|---|
| Styrene | (100 g) |
| n-Butyl methacrylate | (150 g) |
| Methyl methacrylate | (225 g) |
| Methacrylic acid | (25 g) |
| Mercaptoacetic acid | (11.4 g) |
| AEROSOL OT-75 | (3.07 g) |
| TERGITOL NP-40 | (11.97 g) |

After 10-15 min., the following initiator feed was fed into the reactor at a rate of 0.28 mL/min:

| | |
|---|---|
| Ammonium persulfate | (1.5 g) |
| Distilled water | (73.5 g) |

Upon completion of the feeds, the reaction was allowed to cookout at 80°-81° C. for about 15 min.

A post-initiator solution was charged to the reactor:

| | |
|---|---|
| Ammonium persulfate | (0.15 g) |
| Sodium metabisulfite | (0.15 g) |
| Distilled water | (24.7 g) |

The reaction mixture was allowed to cookout at about 80° C. for 30 min.

The latex was milky white and contained no scrap. Latex median particle size was 0.52 micron. The stability was good. The pH of the solution was 2.0. Theoretical and experimental total solids were in agreement (44.5%).

C. Latex Preparation Using Anionic Surfactant (Latex Ref. No. 10-116)

A two liter flask fitted with a water reflux condenser/nitrogen outlet, mechanical stirrer, stainless steel stirring shaft and impeller, thermocouple, nitrogen inlet, initiator feed lines and monomer feed line was charged with the following:

| | |
|---|---|
| Distilled water | (550 g) |
| AEROSOL 501 | (30 g; 50% active solids) |
| Monomer mix | (25 g) |

The mixture was heated to about 85° C., while purging with nitrogen, and the following initiator solution was charged:

| | |
|---|---|
| Ammonium persulfate | (1.5 g) |
| Distilled water | (73.5 g) |

With this addition the reaction temperature was lowered to 80°-81° C. and was held constant throughout the remainder of the polymerization.

The following monomer mix was fed into the reactor at a rate of 3.0 mL/min:

| | |
|---|---|
| Styrene | (100 g) |
| n-Butyl methacrylate | (150 g) |
| Methyl methacrylate | (212.5 g) |
| Methacrylic acid | (37.5 g) |
| Mercaptoacetic acid | (12.6 g) |

After 10-15 min., the following initiator feed was fed into the reactor at a rate of 0.28 mL/min:

| Ammonium persulfate | (1.1 g) |
|---|---|
| Distilled water | (53.9 g) |

Upon completion of the feeds, the reaction was allowed to cookout at 80°-81° C. for about 15 min.

A post-initiator solution was charged to the reactor:

| Ammonium persulfate | (0.15 g) |
|---|---|
| Sodium metabisulfite | (0.15 g) |
| Distilled water | (24.7 g) |

The reaction mixture was allowed to cookout at about 80° C. for 30 min.

The latex was milky white and contained small amount of scrap. Latex median particle size was 0.41 micron. The stability was good. The pH of the solution was 3.4. Theoretical and experimental total solids were in agreement (42.5%).

D. Micro Composite System (MCS) Preparation-Encapsulation Technique (MCS Ref. No. 11-36)

A stainless steel beaker was charged with distilled water (500 g). acetic acid (5 g). SCT-270 (100 g; 20% solids), and DeeFo 495 (10 g; 3% solids). The solution was mixed using a Cowles Dissolver at 1100 rpm for 5 min. The blade speed was increased to 5000 rpm and titanium dioxide R-900 (2000 g) was added slowly in increments of about 200 g. Upon complete addition of the pigment, the grinding was continued for 30 min. Distilled water (756 g) was added and the mixing was continued at high speed for 10 min. The median particle size is 0.36 micron.

A two liter flask fitted with a water reflux condenser/nitrogen outlet, mechanical stirrer, stainless steel stirring shaft and impeller, thermocouple, nitrogen inlet, initiator feed lines and monomer feed line was charged with the following:

| Pigment grind | (330 g; 70% solids) |
|---|---|
| Distilled water | (150 g) |
| BNP-120 | (330 g; 10% active solids in water) |
| Ammonium persulfate | (0.3 g) |

The mixture was stirred at ambient temperature, with nitrogen purge, for about 15 min. Then butyl acrylate (33 g) was charged to the reactor and the solution was heated to 80°-82° C. for 30 min.

The following monomer mix was fed into the reactor at a rate of 2.27 mL/min:

| Styrene | (66 g) |
|---|---|
| Butyl acrylate | (16.5 g) |
| Methyl methacrylate | (207.9 g) |
| Methacrylic acid | (6.6 g) |
| Mercaptoacetic acid | (8.8 g) |

After 5 min., the following initiator feed was started and fed at a rate of 1.5 mL/min:

| Ammonium persulfate | (2.5 g) |
|---|---|
| Distilled water | (247.5 g) |

Upon completion of the feeds, the MCS was allowed to cookout for 15 min.

A post-initiator solution was charged to the reaction mixture:

| Ammonium persulfate | (0.15 g) |
|---|---|
| Sodium metabisulfite | (0.15 g) |
| Distilled water | (24.7 g) |

The cookout was continued at 80° C. for 30 min.

The micro composite system (MCS) containing encapsulated pigment was cooled to room temperature and filtered through a fine mesh cloth. The MCS stability was good, Brookfield viscosity was medium (2750 cps), and pigment encapsulation efficiency was 82%. Solution pH was 3.3. The theoretical and experimental total solids were in agreement at about 40%.

The experimental procedure set forth in Paragraph "B" was used to prepare the latexes set forth in Table III as follows:

TABLE III

LATEXES PREPARED USING MIX SURFACTANT

| LATEX REF | MONOMER | WT % | MERCAPTAN | WT % | CALC. Tg (°C.) | PART. SIZE (MICRON) |
|---|---|---|---|---|---|---|
| 10-68 | ST | 20 | MA | 2.3 | 77 | 0.52 |
|  | BMA | 30 |  |  |  |  |
|  | MMA | 45 |  |  |  |  |
|  | MAA | 5 |  |  |  |  |
| 10-4 | ST | 20 | MA | 2.0 | 75 | 0.42 |
|  | EA | 15 |  |  |  |  |
|  | MMA | 50 |  |  |  |  |
|  | MAA | 5 |  |  |  |  |
|  | HEMA | 10 |  |  |  |  |
| 7-104 | ST | 20 | MA | 2.0 | 68 | 0.31 |
|  | EA | 15 |  |  |  |  |
|  | MMA | 50 |  |  |  |  |
|  | MAA | 5 |  |  |  |  |
|  | M-201 | 10 |  |  |  |  |
| 10-10 | ST | 20 | n-BM | 2.0 | 81 | 0.32 |
|  | BMA | 10 |  |  |  |  |
|  | MMA | 65 |  |  |  |  |
|  | MAA | 5 |  |  |  |  |
| 10-84 | ST | 20 | BMP | 3.8 | 68 | 0.39 |
|  | BMA | 30 |  |  |  |  |
|  | MMA | 40 |  |  |  |  |
|  | MAA | 10 |  |  |  |  |
| 10-86 | ST | 20 | BMP | 3.9 | 71 | 0.36 |
|  | BMA | 30 |  |  |  |  |
|  | MMA | 40 |  |  |  |  |
|  | GMA | 10 |  |  |  |  |
| 10-114 | ST | 20 | BMP | 4.3 | 69 | 0.35 |
|  | BMA | 30 |  |  |  |  |
|  | MMA | 42.5 |  |  |  |  |
|  | GAA | 7.5 |  |  |  |  |

The experimental procedure set forth in Paragraph "C" was used to prepare the latexes in Table IV as follows:

TABLE IV

LATEXES PREPARED USING ANIONIC SURFACTANT

| LATEX REF | MONOMER | WT % | MERCAPTAN | WT % | CALC. Tg (°C.) | PART. SIZE (MICRON) |
|---|---|---|---|---|---|---|
| 10-90 | ST | 20 | MA | 2.3 | 79 | 0.38 |
|  | BMA | 30 |  |  |  |  |
|  | MMA | 40 |  |  |  |  |
|  | MAA | 10 |  |  |  |  |
| 10-20 | ST | 20 | MA | 2.0 | 107 | 0.39 |
|  | MMA | 75 |  |  |  |  |
|  | MAA | 5 |  |  |  |  |

TABLE IV-continued

LATEXES PREPARED USING ANIONIC SURFACTANT

| LATEX REF | MONO- MER | WT % | MER- CAPTAN | WT % | CALC. Tg (°C.) | PART. SIZE (MI- CRON) |
|---|---|---|---|---|---|---|
| 10-116 | ST | 20 | MA | 2.5 | 78 | 0.41 |
|  | BMA | 30 |  |  |  |  |
|  | MMA | 42.5 |  |  |  |  |
|  | MAA | 7.5 |  |  |  |  |
| 10-28 | MMA | 85 | MA | 3.7 | 95 | 0.35 |
|  | MAA | 5 |  |  |  |  |
|  | M-201 | 10 |  |  |  |  |
| 10-12 | ST | 20 | MA | 2.0 | 94 | 0.35 |
|  | BA | 5 |  |  |  |  |
|  | MMA | 70 |  |  |  |  |
|  | MAA | 5 |  |  |  |  |
| 10-100 | ST | 20 | BMP | 4.3 | 71 | 0.93 |
|  | BMA | 30 |  |  |  |  |
|  | MMA | 40 |  |  |  |  |
|  | GMA | 5 |  |  |  |  |
| 7-114 | ST | 20 | t-BM | 1.8 | 100 | 0.36 |
|  | MMA | 75 |  |  |  |  |
|  | GMA (STG) | 5 |  |  |  |  |
| 7-108 | MMA | 85 | t-BM | 1.8 | 88 | 0.34 |
|  | GMA (STG) | 5 |  |  |  |  |
|  | M-201 | 10 |  |  |  |  |
| 10-24 | ST | 20 | DDM | 3.0 | 75 | 0.37 |
|  | BA | 10 |  |  |  |  |
|  | MMA | 65 |  |  |  |  |
|  | MAA | 5 |  |  |  |  |

In table V below, Part A sets forth the characteristics of the latex powders formed from the latexes of Table III, Part B sets forth the characteristics of the latex powders formed from the latexes of Table IV, respectively:

TABLE V

LATEX POWDER DATA

| LATEX REF | POWDER REF | Mn | Mw/ Mn | PS | ACID # | THEORET- ICAL |
|---|---|---|---|---|---|---|
| PART A |
| 10-68 | 9-72 | 4,190 | 2.645 | 7.7 | 43 | 46.6 |
| 10-4 | 9-9 | 5,600 | 2.328 | 4.24 | 43.9 | 44.8 |
| 7-104 | 9-5 | 6,000 | 2.453 | 8.13 | 45.6 | 44.8 |
| 10-10 | 9-17 | 4,900 | 2.012 | 5.72 | 35.4 | 32.6 |
|  |  |  |  |  |  | % GMA |
| 10-84 | 9-80 | 4,700 | 2.109 | 7.88 |  | 9.7 |
| 10-86 | 9-81* | 3,790 | 2.028 | 8.62 |  | 5.7 |
| 10-114 | 9-99 | 3,930 | 2.225 | 10.33 |  | 7.5 |
| PART B |
| 10-90 | 9-84 | 6,140 | 2.507 | 9.29 | 77.82 | 79.2 |
| 10-20 | 9-31 | 6,990 | 2.662 | 10.7 | 45.01 | 44.8 |
| 10-116 | 9-98 | 5,670 | 2.819 | 7.86 | 61.84 | 64.1 |
| 10-28 | 9-45 | 5,440 | 2.713 | 4.43 | 51.25 | 55.1 |
| 10-12 | 9-44 | 8,150 | 2.755 | 4.22 | 46.84 | 44.8 |
|  |  |  |  |  |  | % GMA |
| 10-100 | 9-90 | 3,610 | 2.617 | 8.34 |  | 5.95 |
| 7-114 | 9-11 | 4,660 | 2.025 | 6.02 |  | 5.38 |
| (WATER % = 2.4) |
| 7-108 | 9-8 | 5,520 | 1.843 | 3.33 |  | 6.14 |
| 10-24 | 9-43 | 6,030 | 2.332 | 5.25 |  | 6.14 |

*This powder is depicted in FIGS. 2a–2d.

The experimental procedure set forth in Paragraph "D" was used to prepare the encapsulation systems set forth in Table VI as follows:

TABLE VI

| REF | MONOMER | WT % | SURFAC- TANT WT % | CALC. Tg (°C.) | % ENCAP |
|---|---|---|---|---|---|
| 11-30 | ST | 20 | BNP-120 5.0 | 68* | 62 |
|  | BA | 15 | BSA-197 1.5 |  |  |
|  | MMA | 63 |  |  |  |
|  | MAA | 2 |  |  |  |
| (0.6 PIGMENT/BINDER RATIO) |
| 11-32 | ST | 20 | BNP-120 2.5 | 68* | 101 |
|  | BA | 15 | BSN-187 2.5 |  |  |
|  | MMA | 63 |  |  |  |
|  | MAA | 2 |  |  |  |
| (1:1 PIGMENT/BINDER RATIO) |
| 11-36 | ST | 20 | BNP-120 5.0 | 68* | 82 |
|  | BA | 15 |  |  |  |
|  | MMA | 63 |  |  |  |
|  | MAA | 2 |  |  |  |
| (0.6 PIGMENT/BINDER RATIO) |
| 11-40 | ST | 20 | BNP-120 5.0 | 64 | 91 |
|  | BA | 15 |  |  |  |
|  | MMA | 60 |  |  |  |
|  | GMA | 5 |  |  |  |
| (0.6 PIGMENT/BINDER RATIO) |
| 11-42 | ST | 20 | BNP-120 5.0 | 59 | — |
|  | BA | 15 |  |  |  |
|  | MMA | 50 |  |  |  |
|  | GMA | 15 |  |  |  |
| (0.6 PIGMENT/BINDER RATIO) |

The characteristics of the encapsulated powdered coatings of Table VI are set forth below in Table VII as follows:

TABLE VII

| MCS REF | POWDER REF | Mn | Mw/Mn | PS | ACID # |
|---|---|---|---|---|---|
| 11-30 | 9-73 | 4,640 | 4.808 | 12.3 | 17.0 |
| 11-32 | 9-75 | 5,520 | 3.405 | 10.8 | 16.3 |
| 11-36 | 9-86* | 4,230 | 3.262 | 15.5 | 19.5 |
|  |  |  |  |  | % GMA |
| 11-40 | 9-96 | 3,630 | 2.422 | 9.1 | 3.8 |
| 11-42 | 9-101 | 3,910 | 2.982 | 9.4 | 8.6 |

*This encapsulated powder is depicted in FIGS. 3a–3d.

NOTES

Latexes

1. Mix surfactant is TERGITOL NP-40 (1.9 wt %) and AEROSOL OT-75 (0.5 wt %). TERGITOL NP-40 (70% active solids in water) is a nonyl phenol polyethyloxylated nonionic surfactant and is supplied by Union Carbide Corporation. AEROSOL OT-75 (75% active solids in a water-alcohol solution) is a sodium dioctyl sulfosuccinate anionic surfactant and is supplied by American Cyanamid Company.

2. Anionic surfactant is AEROSOL 501 (3.0 wt %). This surfactant (50% active solids in aqueous solution) is a proprietary mixture of sulfosuccinate surfactants and is supplied by American Cyanamid Company.

3. STG means staged feed.

4. All wt % are based on total monomer unless otherwise noted.

5. Acid values reflect the MAA content as well as the MA (mercaptoacetic acid) content. These values are reported as mg KOH/g of sample.

MCS

1. Wt % surfactant based on MCS (i.e., polymer and pigment).

2. Correction of acid and % GMA values for weight of pigment and mercaptoacetic acid (acid value only)

yields values which are in agreement with the theoretical values.

3. Calculated Tg* does not include reactive surfactant contribution.

4 Mercaptans:
(a) MAA MCS: Mercaptoacetic acid (2.7 wt % based on monomer).
(b) GMA MCS: Butyl mercaptopropionate (4.5 wt % based on monomer).

5. % Encapsulation: Pigment encapsulation efficiency was measured and determined to be in the range of 50-100%.

6. Reactive surfactants: (products of PPG-MAZER)
BSA-197: Proprietary anionic sulfonate surfactant
BSN-187: Proprietary nonionic surfactant.

Common to Latexes and MCS

1. Abbreviations:
ST=Styrene
BA=Butyl Acrylate
BMA=Butyl Methacrylate
EA=Ethyl Acrylate
MMA=Methyl Methacrylate
MAA=Methacrylic Acid
GMA=Glycidyl Methacrylate
HEMA=Hydroxyethyl Methacrylate
M-201=Hydroxy Polyester Methacrylate (UCC Product: Tone Monomer M-201)
MA=Mercaptoacetic Acid
n-BM=1-Butyl Mercaptan
t-BM=tert-Butyl Mercaptan
BMP=1-Butyl-3-Mercaptopropionate
DDM=1-Dodecyl Mercaptan 2. Average molecular weights were determined by size exclusion chromatography using polystyrene standards. Mn is the number average molecular weight. Mw/Mn is the molecular weight distribution or polydispersivity).

3. Initiators: Ammonium or potassium persulfate is used with MAA containing latexes (or MCS). Potassium persulfate is used with GMA containing latexes (or MCS).

4. Mediate particle size was determined by laser diffraction particle size analysis.

5. Buffer was used only with GMA containing latexes (or MCS). Sodium bicarbonate was the buffer of choice. About 4 g of buffer was used for every 3 g of persulfate initiator. Buffer was commonly added to the initial reactor charge; however, the buffer was added to the reactor charge as well as the initiator feed for several experiments.

D. POWDER PREPARATION AND APPLICATION

1. Mini Spray Drier

The spray dryer is a Buchi/Brinkmann Model 190 Mini Spray Dryer.

The latexes (or MCS) (200 g) were filtered through a cloth filter and diluted with an equal amount of distilled water and then spray dried.

Typical spray dryer setting were as follows:
flow indicator: 70-800 NL/hr (NL=normliter)
aspirator: 15+ (vacuum: 700-680 torr)
pump rate 3-4 (equivalent to about 6-8 mL/min)
inlet temperature: 99°-115° C.
outlet temperature: 40°-65° C.
air pressure: 5 bar Spray drying efficiency using these conditions is typically about 50%. No attempts have been made to optimize this system since the powders are not needed in larger quantities at this time.

2. Electrostatic Sprayer

The powders were applied to conductive substrates (test panels) using a Nordson manually operated powder spray gun (Model NPE-2M) and booth assembly. Common electrostatic spraying conditions were as follows:
Atomizing air pressure: 40 psi
flow rate: 20 psi
electrostatic charge: 90 KV The test panels were Bonderite #37 steel and Metopac panels. Powders were often used as received from the spray dryer, i.e. without sieving.

3. Coating Evaluation

Materials were evaluated as is, i.e., without the addition of flow aids, degassing agents, etc. Solvent A is methyl ethyl ketone (MEK). Solvent B is 10% MEK and 90% xylenes. SCX resins were supplied by S. C. Johnson & Son, Inc. The resins and TGIC combinations were ball milled and sieved (275 mesh) before use.

EXAMPLE #1:

A 1:1 (functionality) mixture of Latex Ref. Nos. 10-68 AND 10-84 was made and then spray dried:
curing temp (° C.): 165
curing time (min): 15
film thickness (mil): 2.3
ATI (distinctness of image): 45
20° gloss: 81
60° gloss: 95
scratch hardness (pencil): F
forward impact (in.lb): 10
reverse impact (in.lb): 10
solvent A resistance (failure): 41
solvent B resistance (failure): 51
visual: slight orange peel

EXAMPLE #2:

A 1:3 (functionality) mixture of Latex Ref. Nos. 10-68 AND 10-84 was made and then spray dried:
curing temp (° C.): 195
curing time (min): 15
film thickness (mil): 1
ATI (distinctness of image): 30
20° gloss: 74
60° gloss: 96
scratch hardness (pencil): H
forward impact (in.lb): 10
reverse impact (in.lb): <10
solvent A resistance (failure): 24
solvent B resistance (failure): 30
visual: slight orange peel

EXAMPLE #3:

A 1:2 (functionality) mixture of Latex Ref. Nos. 10-68 AND 10-114 was made, spray dried and then applied as a coating onto a substrate:
curing temp (° C.): 180
curing time (min): 22.5
film thickness (mil): 0.5
ATI (distinctness of image): 16
20° gloss: 22
60° gloss: 62
scratch hardness (pencil): 3H
forward impact (in.lb): 20
reverse impact (in.lb): 20
solvent A resistance (failure): 30 solvent B resistance (failure): 70
visual: slight orange peel

EXAMPLE #4 (COMPARISON EXAMPLE):

A 1:1 (functionality) mixture of S. C. Johnson & Son, Inc.'s SCX-817C (commercial, ground acid modified acrylic resin) described in their brochure entitled "New Thermosetting Acrylics for Powder Coatings" (Wisconsin, Aug. 1988) and TGIC (triglycidyl isocyanurate) was made and coated onto a subtrate as follows:
curing temp (° C.): 165
curing time (min): 30
film thickness (mil): 1.4
ATI (distinctness of image): 11
20° gloss: 34
60° gloss: 80
scratch hardness (pencil): 3H
forward impact (in.lb): 10
reverse impact (in.lb): 5
solvent A resistance (failure): 23
solvent B resistance (failure): 30
visual: cratering and slight orange peel

EXAMPLE #5 (COMPARISON EXAMPLE):

A 1.3 (functionality) mixture of S. C. Johnson & Son, Inc.'s SCX-817C (commercial, ground acid modified acrylic resin) described in their brochure entitled "New Thermosetting Acrylics for Powder Coatings" (Wisconsin, Aug. 1988) and TGIC triglycidyl isocyanurate) was made and applied to a coating.
curing temp (° C.): 165
curing time (min): 15
film thickness (mil): 1.1
ATI (distinctness of image): 16
20° gloss: 19
60° gloss: 63
scratch hardness (pencil): H
forward impact (in.lb): 20
reverse impact (in.lb): <10
solvent A resistance (failure): 19
solvent B resistance (failure): 31
visual: cratering and slight orange peel

EXAMPLE 6 (COMPARISON EXAMPLE)

A 1:1 (functionality) mixture of S. C. Johnson & Son, Inc.'s SCX-815B* (commercial, round acid modified acrylic resin) described in their brochure entitled "New Thermosetting Acrylics for Powder Coatings" (Wisconsin, Aug. 1988) and TGIC (triglycidyl isocyanurate) was made and applied as a coating onto a substrate:
* This commercially ground powder is depicted in FIGS. 1a-1d.
curing temp (° C.): 165
curing time (min): 15
film thickness (mil): 0.9
ATI (distinctness of image): 30
20° gloss: 72
60° gloss: 95
scratch hardness (pencil): H
forward impact (in.lb): 5
reverse impact (in.lb): 5
solvent A resistance (failure): 10
solvent B resistance (failure): 28
visual: cratering and slight orange peel

What is claimed is:

1. A process of forming a thermosettable, coreactable particulate powdered composition which comprises spray drying an aqueous dispersion containing two or more coreactive copolymers, at least one of the coreactive copolymers having a weight average molecular weight of less than about 50,000 and each coreactive copolymer having at least one functional group and made by polymerizing (i) at least one olefinically unsaturated monomer and (ii) at least one functionality providing monomer which is capable of being polymerized with the at least one olefinically unsaturated monomer, to form particles of the powdered composition, wherein a substantial portion of the particles each contain functional groups which are thermosettably reactive with each other and the particles are substantially uniform and spherical.

2. The process of claim 1, wherein crosslinking agent is added to the particulate powder after spray drying.

3. The process of claim 1, wherein prior to or during spray drying or prior to and during spray drying, the aqueous dispersion containing the coreactive copolymers is mixed with a second aqueous dispersion containing a further copolymer having at least one functional group which is thermosettably reactive with at least one of the functional groups of the coreactive copolymers.

4. A process of forming a thermosettable, coreactive particulate powdered composition which comprises spray drying an aqueous dispersion containing (a) two or more coreactive copolymers, each coreactive copolymer having at least one functional group and made by polymerizing (i) at least one olefinically unsaturated monomer and (ii) at least one functionality providing monomer which is capable of being polymerized with the at least one olefinically unsaturated monomer and (b) crosslinking agent, to form particles of the powered composition, wherein a substantial portion of the particles each contain functional groups and crosslinking agent which are thermosettably reactive with each other and the particles are substantially uniform and spherical.

5. The process of claim 4, wherein additional crosslinking agent is added to the particulate powder after spray drying.

6. The process of claim 4, wherein prior to or during spray drying or prior to and during spray drying, the aqueous dispersion containing the coreactive copolymers is mixed with a second aqueous dispersion containing a further copolymer having at least one functional group which is not substantially thermosettably reactive with the functional groups of the coreactive copolymers.

7. The process of claims 3 or 6, wherein the coreactive copolymers and the further copolymer are made with the same at least one olefinically unsaturated monomer.

8. The process of claims 1 or 4, wherein one or more of the coreactive copolymers in the aqueous dispersion has a glass transition temperature ($T_g$) of greater than about 25° C.

9. The process of claim 8, wherein one or more of the coreactive copolymers in the aqueous dispersion has a glass transition temperature in the range of from about 35° C. to about 110° C.

10. The process of claim 8, wherein one or more of the coreactive copolymers in the aqueous dispersion has a glass transition temperature in the range of from about 45° C. to about 80° C.

11. The process of claim 8, wherein one or more of the coreactive copolymers in the aqueous dispersion has a glass transition temperature ($T_g$) of greater than about 60° C.

12. The process of claims 1 or 4, wherein the weight average molecular weight of coreactive copolymers having a glass transition temperature ($T_g$) of greater than about 60° C. are in the range of from about 4,000 to about 25,000.

13. The process of claims 1 or 4, wherein the molecular weight distribution of the coreactive copolymers in the aqueous dispersion is in the range of from about 1.0 to about 4.0.

14. The process of claims 1 or 4, wherein the at least one olefinically unsaturated monomer is an alpha-beta olefinic unsaturated monomer selected from the group consisting of esters of a $C_1$–$C_{12}$ monohydric alcohol and acrylic or methacrylic acid; $C_3$ to $C_{12}$ monovinyl hydrocarbons and substituted vinyl hydrocarbons; and combinations thereof.

15. The process of claim 14, wherein the at least one olefinically unsaturated monomer is selected from the group consisting of methyl methacrylate, ethyl acrylate, butyl acrylate, hexyl acrylate, 2-ethylhexyl methacrylate, butyl methacrylate, lauryl methacrylate, isodecyl methacrylate, acrylic modified caprolactones, styrene, alpha methyl styrene, vinyl toluene, t-butyl styrene, chlorostyrene, vinyl chloride, acrylonitrile, methacrylonitrile, vinyl acetate, vinyl pivalate, vinyl versatate, and combinations thereof.

16. The process of claims 1 or 4, wherein the at least one functionality providing monomer is selected from the group having epoxy functionality, hydroxyl functionality, carboxylic acid functionality, amide functionality, anhydride functionality, and combinations thereof.

17. The process of claim 16, wherein the epoxy functional monomers include glycidyl esters of a monoethylenically unsaturated acid.

18. The process of claim 16, wherein the hydroxyl functional monomers include esters of acrylic or methacrylic acids and aliphatic alcohols.

19. The process of claim 16, wherein the carboxylic acid functional monomers include acrylic acid, methacrylic acid, crotonic acid, itaconic acid, fumaric acid, maleic acid, citraconic acid; monoalkyl esters of unsaturated dicarboxylic acids or combinations thereof.

20. The process of claim 16, wherein the amide functional monomers include acrylamide, methacrylamide, or combinations thereof.

21. The process of claim 16, wherein the anhydride functional monomers include maleic anhydride, itaconic anhydride, dichloromaleic anhydride, dodecenyl succinic anhydride, tetrahydrophthalic anhydride, or combinations thereof.

22. The process of claims 1 or 4, wherein the coreactive copolymers are polymerized in the presence of at least one chain transfer agent.

23. The process of claim 22, wherein the chain transfer agent is selected from the group consisting of aliphatic mercaptans, mercaptocarboxyl acid having from 2 to 8 carbon atoms and their esters; acetone, toluene, benzene, isopropyl alcohol, acetonitrile, ethyl acetate, acetaldehyde; carbon tetrachloride, carbon tetrabromide, chloroform, bromotrichloromethane, and combinations thereof.

24. The process of claim 4, wherein the crosslinking agent is selected from the group consisting of isocyanates, epoxides, polycarbodiimides and combinations thereof.

25. The process of claim 24, wherein the isocyanates are selected from the group consisting of isophorone diisocyanate, hexamethylene diisocyante, toluene diisocyanate, diphenylmethane diisocyanate, 1-chlorophenyl diisocyanate, triphenylmethane diisocyanate, trimethyl hexamethylene diisocyanate, and combinations thereof.

26. The process of claim 24, wherein the epoxides are selected from the group consisting of triglycidyl isocyanurate, 3,4-epoxy cyclohexyl methyl-3,4-epoxy cyclohexyl carboxylate, and combinations thereof.

27. The process of claims 1 or 4, wherein the coreactive copolymers are polymerized in the presence of a free radical initiator.

28. The process of claim 27, wherein the free radical initiator is selected from the group consisting of peroxides, azo initiators, persulfates, and combinations thereof.

29. The process of claim 28, wherein the persulfate initiators are used in conjunction with a reducing agent to provide a redox initiated polymerization.

30. The process of claims 1 or 4, wherein the coreactive copolymers are polymerized in the presence of one or more surfactants to stabilize the dispersion.

31. The process of claim 30, wherein the surfactant is an anionic surfactant selected from the group consisting of diester sulfosuccinates, monoester sulfosuccinates, nonyl phenol ether sulfates, sodium dioctyl sulfosuccinate, sodium bistridecyl sulfosuccinate, sodium dihexyl sulfosuccinate, sodium dicyclohexyl sulfosuccinate, sodium diamyl sulfosuccinate, sodium diisobutyl sulfosuccinate, disodium ethoxylated alcohol half ester of sulfosuccinic acid, disodium ethoxylated nonyl phenol half ester of sulfosuccinic acid, disodium isodecyl sulfosuccinate ammonium salt of sulfated nonylphenoxy poly(ethyleneoxy) ethanol having various degrees of ethoxylation, and combinations thereof.

32. The process of claim 30, wherein the surfactant is a non-ionic surfactant comprising one or more nonyl phenol ethoxylates.

33. The process of claim 30, wherein the surfactant is a reactive surfactant which reacts with one or more of the coreactive copolymers.

34. The process of claim 33, wherein the reactive surfactant is selected from the group consisting of sodium vinyl sulfonate, maleic acid half-ester of monomethylether of polyethylene glycol, maleic acid diester of monomethylether of polyethylene glycol, and combinations thereof.

35. The process of claims 1 or 4, wherein the aqueous dispersion additionally contains water-insoluble particulate solids.

36. The process of claim 35, wherein the water-insoluble particulate solids are selected from the group consisting of metals, metal oxides, pigments, fillers, and combinations thereof.

37. The process of claim 35, wherein at least a portion of the water-insoluble particulate solids are encapsulated by the polymerization of the said monomers in the presence of at least one effective surfactant which is present in the dispersion in an amount which is below the critical micelle concentration.

38. The process of claim 37, wherein the at least one surfactant contains a polyoxyethylene chain as a hydrophilic group and a nonylphenyl group as a hydrophobic group.

39. The process of claim 37, wherein the at least one surfactant is selected from the group consisting of octyl or nonyl phenol polyethoxylates containing 10 to 150 ethylene oxide groups, polyethoxylated esters of fatty acids, polyethoxylated esters of fatty alcohols, ethylene oxide/propylene oxide block copolymers, fatty amine ethoxylates, alkyl-phenol formaldehyde novolac resin alkoxylates and combinations thereof.

40. The process of claim 37, wherein the at least one surfactant is present in the aqueous dispersion during polymerization of the coreactive copolymers in an amount of from about 1 to about 30 weight percent based on the amount of the particulate solids in the dispersion.

41. The process of claim 37, wherein the at least one surfactant is present in the aqueous dispersion during polymerization of the coreactive copolymers in an amount of from about 5 to about 20 weight percent based on the amount of the particulate solids in the dispersion.

42. The process of claims 1 or 4, wherein the aqueous dispersion is stabilized, at least in part, by a colloidal stabilizing agent.

43. The process of claim 42, wherein the colloidal stabilizing agent is selected from the group consisting of polymethacrylic acid, polyvinyl alcohol and combinations thereof.

44. The process of claims 1 or 4, wherein the aqueous dispersion is spray dried at a temperature in the range of from about 30° C. to about 150° C.

45. The process of claims 1 or 4, wherein the particles have a median particle size of from about 0.1 to 50.0 microns.

46. The process of claim 37, wherein the encapsulated particles are formed having a median particle size of from about 0.4 to 50.0 microns which particles are substantially uniform and spherical.

* * * * *